United States Patent
Holder et al.

(10) Patent No.: US 12,521,069 B2
(45) Date of Patent: Jan. 13, 2026

(54) SYSTEM FOR ACQUISITION AND ANALYSIS OF MATERNAL AND/OR FETAL PHYSIOLOGICAL SIGNALS

(71) Applicant: Marani Health, Inc., Oakdale, MN (US)

(72) Inventors: Ann Holder, Stillwater, MN (US); Kathleen Ann Tune, Minneapolis, MN (US); Christian Larson, Minneapolis, MN (US); Mark Holm, Rochester, MN (US); Mehdi Shokoueinejad, New Brighton, MN (US); Ognjen Milicevic, Belgrade (RS)

(73) Assignee: Marani Health, Inc., Oakdale, MN (US)

( * ) Notice: Subject to any disclaimer, the term of this patent is extended or adjusted under 35 U.S.C. 154(b) by 378 days.

(21) Appl. No.: 18/145,562

(22) Filed: Dec. 22, 2022

(65) Prior Publication Data
US 2023/0200746 A1    Jun. 29, 2023

Related U.S. Application Data

(60) Provisional application No. 63/265,952, filed on Dec. 23, 2021.

(51) Int. Cl.
*A61B 5/00* (2006.01)
*A61B 5/021* (2006.01)

(52) U.S. Cl.
CPC ............ *A61B 5/7275* (2013.01); *A61B 5/021* (2013.01); *A61B 5/7267* (2013.01)

(58) Field of Classification Search
None
See application file for complete search history.

(56) References Cited

U.S. PATENT DOCUMENTS

D747,077 S    1/2016  Jayalath et al.
9,498,128 B2  11/2016 Jayalath et al.
(Continued)

FOREIGN PATENT DOCUMENTS

KR    20190119198 A    10/2019
WO    2018/160446 A1    9/2018
(Continued)

OTHER PUBLICATIONS

Grobman et al., "Methods of clinical prediction," Elsevier, American Journal of Obstetrics & Gynecology, vol. 194, No. 3, doi:10.1016/J.AJOB.2005.09.002, Mar. 1, 2006, pp. 888-894.
(Continued)

*Primary Examiner* — Carl H Layno
*Assistant Examiner* — Manolis Pahakis
(74) *Attorney, Agent, or Firm* — Banner & Witcoff, Ltd.

(57) ABSTRACT

A system includes a wearable device configured to be worn by a pregnant patient and including a plurality of electrodes, the wearable device configured to sense a first patient data associated with the patient and her fetus, a second device configured to sense a second patient data associated with the patient and her fetus, and a computing device configured to obtain the first and second patient data. The computing device is also configured to identify first features of a maternal or a fetal heart rate signal determined from the first patient data and to identify second features of a maternal or a fetal biometric signal determined from the second patient data, and to determine, based on applying the first and second features as inputs to a machine learning model, predicted outcomes associated with the patient, and to generate reports including an indication of the predicted outcomes for display.

20 Claims, 13 Drawing Sheets

(56) References Cited

U.S. PATENT DOCUMENTS

| | | | |
|---|---|---|---|
| D777,331 S | 1/2017 | Jayalath et al. | |
| D779,167 S | 2/2017 | Morenstein et al. | |
| 9,579,055 B1* | 2/2017 | Rood | A61B 5/6831 |
| D786,538 S | 5/2017 | Morenstein et al. | |
| 9,913,611 B2 | 3/2018 | Wiebe et al. | |
| 10,105,098 B2 | 10/2018 | Wiebe et al. | |
| 10,143,405 B2 | 12/2018 | Jayalath et al. | |
| D842,481 S | 3/2019 | Jayalath et al. | |
| 10,292,652 B2 | 5/2019 | Berg et al. | |
| 10,321,832 B2 | 6/2019 | Berg et al. | |
| 10,357,688 B2 | 7/2019 | Wiebe et al. | |
| 10,362,993 B2 | 7/2019 | Wiebe et al. | |
| 10,398,376 B2 | 9/2019 | Berg et al. | |
| 10,413,219 B2 | 9/2019 | Jayalath et al. | |
| 10,524,734 B2 | 1/2020 | Korzinov et al. | |
| 10,617,354 B2 | 4/2020 | Berg et al. | |
| 10,925,540 B2 | 2/2021 | Berg et al. | |
| 10,952,646 B2 | 3/2021 | Jayalath et al. | |
| 11,097,157 B2 | 8/2021 | Wiebe et al. | |
| 11,103,750 B2 | 8/2021 | Wiebe et al. | |
| 11,224,375 B2 | 1/2022 | Friedman et al. | |
| 2005/0267377 A1* | 12/2005 | Marossero | A61B 5/02411 |
| | | | 128/920 |
| 2009/0259133 A1 | 10/2009 | Wolfberg et al. | |
| 2013/0102856 A1* | 4/2013 | Wolfberg | A61B 5/344 |
| | | | 600/382 |
| 2013/0102857 A1* | 4/2013 | Wolfberg | A61B 5/344 |
| | | | 600/382 |
| 2015/0148619 A1 | 5/2015 | Berg et al. | |
| 2015/0230719 A1 | 8/2015 | Berg et al. | |
| 2015/0305677 A1 | 10/2015 | Berg et al. | |
| 2015/0359485 A1 | 12/2015 | Berg et al. | |
| 2016/0270658 A1 | 9/2016 | Ater | |
| 2017/0035354 A1 | 2/2017 | Jayalath et al. | |
| 2017/0173391 A1 | 6/2017 | Wiebe et al. | |
| 2018/0140901 A1 | 5/2018 | Wiebe et al. | |
| 2018/0140902 A1 | 5/2018 | Wiebe et al. | |
| 2019/0046086 A1 | 2/2019 | Jayalath et al. | |
| 2019/0046107 A1 | 2/2019 | Jang et al. | |
| 2019/0046839 A1 | 2/2019 | Jang et al. | |
| 2019/0076699 A1 | 3/2019 | Wiebe et al. | |
| 2019/0133536 A1* | 5/2019 | Roberts | A61B 5/0011 |
| 2019/0151713 A1 | 5/2019 | Berg et al. | |
| 2019/0261874 A1 | 8/2019 | Berg et al. | |
| 2019/0282856 A1 | 9/2019 | Wiebe et al. | |
| 2019/0344121 A1 | 11/2019 | Wells et al. | |
| 2020/0000378 A1 | 1/2020 | Jayalath et al. | |
| 2020/0113470 A1* | 4/2020 | Friedman | A61B 5/349 |
| 2020/0151595 A1 | 5/2020 | Jayalath et al. | |
| 2020/0178880 A1* | 6/2020 | Penders | A61B 5/7267 |
| 2020/0397372 A1 | 12/2020 | Berg et al. | |
| 2021/0153780 A1 | 5/2021 | Jayalath et al. | |
| 2022/0175324 A1* | 6/2022 | Holder | A61B 5/02055 |

FOREIGN PATENT DOCUMENTS

| | | |
|---|---|---|
| WO | 2019016759 A1 | 1/2019 |
| WO | 2021050818 A1 | 3/2021 |

OTHER PUBLICATIONS

Khandoker et al., "Estimating Fetal Age by Fetal Maternal Heart Rate Coupling Parameters," 2020 42nd Annual International Conference of the IEEE Engineering in Medicine & Biology Society, IEEE, doi:10.1106/EMBC44109.2020.9176049, Jul. 20, 2020, pp. 604-607.

Khatibi et al., "Analysis of big data for prediction of provider-initiated preterm birth and spontaneous premature deliveries and ranking the predictive features," Springer, Archives of Gynecology and Obstertrics, vol. 300, No. 6, https://doi.org/10.1007/s00404-019-05325-3, Oct. 24, 2019, pp. 1565-1582.

International Search Report and Written Opinion of International Application No. PCT/US2022/082263 dated Apr. 4, 2023, 14 pp.

* cited by examiner

SYSTEM FOR ACQUISITION AND ANALYSIS OF MATERNAL AND/OR FETAL PHYSIOLOGICAL SIGNALS

CROSS REFERENCE TO RELATED APPLICATIONS

This application claims the benefit of U.S. Provisional Patent Application No. 63/265,952, filed Dec. 23, 2021, which is incorporated by reference herein in its entirety.

TECHNICAL FIELD

The disclosure relates generally to medical device systems and, more particularly, medical device systems configured to monitor patient parameters.

BACKGROUND

Reliable assessment of fetal and maternal well-being is a persistent challenge of current prenatal monitoring technologies, including the non-invasive cardiotocography (CTG) technologies and invasive fetal scalp electrodes. The poor specificity and reliability of these techniques have the potential to lead to adverse maternal and fetal outcomes, including unnecessary cesarean sections, related post-surgical complication, inaccurate detection of fetal hypoxia and other fetal complications.

SUMMARY

In general, the disclosure describes devices, systems, and/or methods for predicting maternal and/or fetal health outcomes based on maternal and/or fetal data. The maternal and/or fetal data (also referred to herein as "patient data") may include, for example, data regarding sensed biopotential signals such as maternal and/or fetal electrocardiography (ECG) signals, maternal electromyography (EMG) signals, maternal electrohysterography (EHG) signals, and/or other biopotential, biological, biometric, or physiological signals. The patient data may be first patient data, and may be acquired via a first apparatus for non-invasively acquiring maternal and/or fetal biopotential signals, such as ECG, EHG, and EMG signals. The first apparatus may be a first wearable device comprising a plurality of electrodes configured to sense maternal and/or fetal biopotential signals associated with the patient and her fetus. The systems and/or methods may further include a second apparatus for acquiring second (e.g., additional) patient data, e.g., maternal and/or fetal biometric data. The second apparatus may be a mobile device and/or a wearable device, such as a mobile phone, a watch, or the like. The second patient data may include maternal and/or fetal biometric data such as blood pressure, weight, glucose, pH blood levels, blood oxygen level, breathing rate, patient movement, temperature, a uterine contraction data, a patient posture, a patient movement, a skin impedance, a stress level, a bioimpedance spectrum, or an acoustic signal, and other biometric data. In some examples, the second patient data may further include data obtained from a mental health assessment, a social determinates of health (SDoH) assessment, socio-economic data for the patient, etc. The second patient data may further include any data that may be relevant for the prediction of maternal and/or fetal outcomes, e.g., a medical history and/or profile of the patient including current conditions, such as gestational diabetes, or the like, and the disclosure is not limited in this respect.

The techniques may assist clinicians in identification of features or patterns in patient data that could lead to sub-optimal outcomes and support real time decision-making by a clinical team, thus helping to promote timely, appropriate interventions and reducing costs associated with adverse outcomes.

In some examples, at least some of the first patient data is obtained by a first non-invasive wearable device. The first wearable device includes a wearable (e.g., a garment or a band) worn about the torso of a pregnant mother and one or more sensors affixed to or embedded in the wearable. The one or more sensors are configured to capture, for example, ECG signals indicative of maternal and/or fetal cardiac activity, EMG and/or EHG signals indicative of uterine contractions, and/or other biological or biometric signals of the mother or the fetus, e.g., blood pressure.

In some examples, at least some of the second (e.g., additional) patient data is obtained by a second device, which may be a wearable device such as a watch, or a nonwearable device. The device may include a smartphone, a smartwatch, a sensor, or any other suitable device configured to capture biometric signals and/or data. The second patient data acquired via the second device, in conjunction with the first patient data from the first wearable device, may improve prediction of maternal and/or fetal outcomes, improve identification of features or patterns in patient data that could lead to sub-optimal outcomes, and improve timely, appropriate interventions.

In some examples, according to one or more techniques of the disclosure, a training data set including first patient data, second patient data, and associated outcomes obtained for each of a plurality of patients (e.g., pregnant human mothers and their fetuses) is used to train one or more machine learning models for maternal and/or fetal outcome prediction. The machine learning model(s) relate various features of the first patient data and/or second patient data to the prediction of one or more maternal or fetal outcomes (either adverse or non-adverse).

In some examples, according to one or more techniques of the disclosure, a cloud-based pregnancy monitoring system receives first patient data and second patient data associated with a pregnant mother, applies the first and second patient data to the trained machine learning model, and predicts one or more fetal and/or maternal outcomes based on the first and second patient data.

In one example, this disclosure describes a system including: a first wearable device configured to be worn by a pregnant patient, the first wearable device further includes a plurality of electrodes configured to sense a first patient data associated with the patient and her fetus; a second device configured to sense a second patient data associated with the patient and her fetus; and a computing device configured to: receive first patient data from the first wearable device; receive second patient data from the second wearable device; identify one or more first features of a maternal and/or fetal ECG or heart rate signal determined from the first patient data; identify one or more second features of a maternal and/or fetal biometric signal determined from the second patient data; determine, based on applying the one or more first features and the one or more second features as inputs to a machine learning model trained with historical first patient data and historical second patient data, one or more predicted outcomes associated with the patient; and generate one or more reports including an indication of the one or more predicted outcomes for display on one or more of a patient computing device or a provider computing device.

In another example, this disclosure describes a method of generating a maternal or fetal outcome prediction, the method comprising: obtaining, by processing circuitry, first patient data from the first wearable device; obtaining, by processing circuitry, second patient data from the second device; identifying, by processing circuitry, one or more first features of a maternal or a fetal heart rate signal determined from the first patient data; identifying, by processing circuitry, one or more second features of a maternal biometric signal or a fetal biometric signal determined from the second patient data; determining, by processing circuitry and based on applying the one or more first features and the one or more second features as inputs to a machine learning model trained with historical first patient data and historical second patient data, one or more predicted outcomes associated with the patient; and generating, by processing circuitry, one or more reports including an indication of the one or more predicted outcomes for display on one or more of a patient computing device or a provider computing device.

In another example, this disclosure describes a non-transitory computer readable medium comprising instructions that when executed by processing circuitry cause the processing circuitry to: obtain first patient data from the first wearable device; obtain second patient data from the second device; identify one or more first features of a maternal or a fetal heart rate signal determined from the first patient data; identify one or more second features of a maternal and/or fetal biometric signal determined from the second patient data; determine, based on applying the one or more first features and the one or more second features as inputs to a machine learning model trained with historical first patient data and historical second patient data, one or more predicted outcomes associated with the patient; and generate one or more reports including an indication of the one or more predicted outcomes for display on one or more of a patient computing device or a provider computing device.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
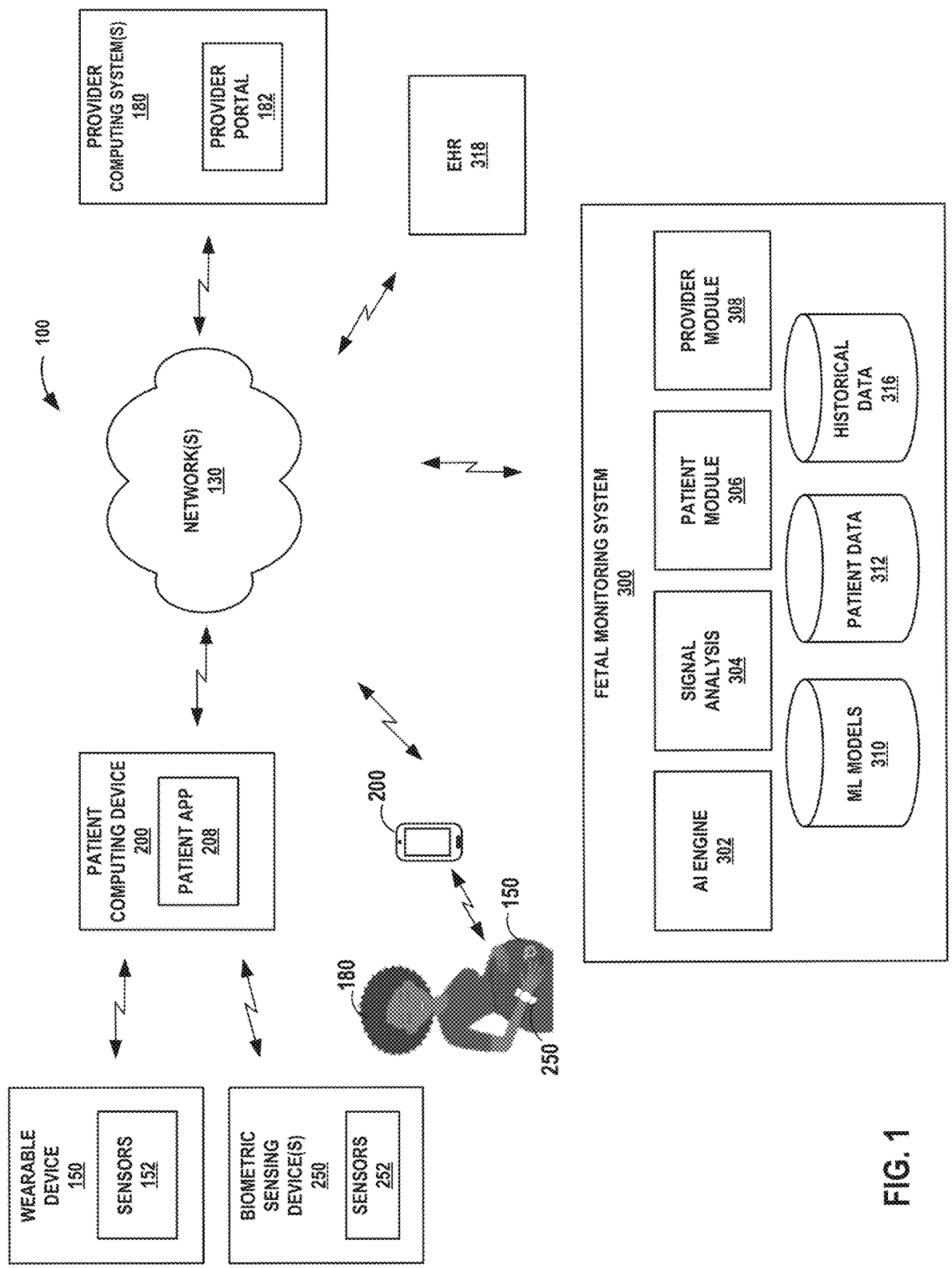
FIG. 1 is a diagram of an example system for the acquisition and communication of patient data and prediction of maternal and/or fetal outcomes using trained machine learning model(s) in accordance with one or more techniques of the disclosure.

In general, the disclosure describes devices, systems, and/or methods for predicting maternal and/or fetal health outcomes based on maternal and/or fetal data associated with a pregnant patient and her fetus. The maternal and/or fetal data (also referred to herein as "patient data") may include, for example, data regarding sensed biopotential signals such as maternal and/or fetal electrocardiography (ECG) signals, maternal electromyography (EMG) signals, maternal electrohysterography (EHG), and/or other biological or biometric signals, e.g., blood pressure. The patient data may be first patient data, and may be acquired via a first apparatus for non-invasively acquiring maternal and/or fetal biopotential signals, such as ECG, EHG, and/or EMG signals, and/or other maternal and/or fetal signals, e.g., blood pressure. The apparatus may be a wearable device comprising a plurality of sensors, e.g., electrodes, configured to sense maternal and/or fetal physiological, biometric, or biological signals, such as biopotential signals associated with the patient and her fetus. The systems and/or methods may further include a second apparatus for acquiring second (e.g., additional) patient data, e.g., maternal and/or fetal biometric data. The second apparatus may be a device configured to sense biometric data, a mobile device such as a mobile phone, a wearable device, such as a watch or smartwatch, a ring or smartring, a limb sensor, a body sensor, a patch sensor, an ear sensor and/or hearing aid configured to acquire biometric data, a pulse oximeter, a temperature sensor, a bioimpedance sensor, and/or any non-invasive or wearable article including a sensor or detector configured to acquire biometric data, or the like. The second patient data may include maternal and/or fetal biometric data such as blood pressure, weight, glucose, pH blood levels, blood oxygen level, breathing rate, patient movement, temperature, a uterine contraction data, a patient posture, a patient movement, a skin impedance, a stress level, a bioimpedance spectrum, or an acoustic signal (acquired using, for example, doppler ultrasound or other acoustic techniques), and other biometric data. In some examples, the second patient data may further include data obtained from a mental health assessment, a social determinates of health (SDoH) assessment, socio-economic data, etc. The second patient data may further include any data that may be relevant for the prediction of maternal and/or fetal outcomes, e.g., a medical history and/or profile of the patient including current conditions, such as gestational diabetes, or the like, and the disclosure is not limited in this respect.

Analysis of the maternal and/or fetal biopotential signals acquired by the wearable device (e.g., first patient data) and/or second patient data may assist clinicians in identification of features or patterns in first and/or second patient data that could lead to sub-optimal outcomes, support real time decision-making by the clinical team, thus helping to promote timely, appropriate interventions, and decrease overall costs associated with adverse maternal and fetal outcomes. The techniques may aid clinicians and healthcare providers to improve prenatal care and to better manage risk of pregnancy patients while at home, allowing for continued monitoring and alert triggering. In addition, healthcare costs associated with pregnancy may be reduced by eliminating unnecessary travels and clinic visits, saving time and stress to future mothers. In addition, collection of relevant first and/or second patient data may provide a framework for clinical and scientific research in the field of prenatal care and support continuous updates and refinements to the predictive models and the resulting predicted maternal and/or fetal outcomes.

In some examples, according to one or more techniques of the disclosure, a training data set including first and/or second patient data and associated outcomes obtained for each of a plurality of patients (e.g., pregnant human mothers and their fetuses) is used to train a machine learning model for maternal and/or fetal outcome prediction. The machine learning model is indicative of first features of the first patient data and second features of the second patient data are predictive of one or more maternal or fetal outcomes (either adverse or non-adverse).

In some examples, according to one or more techniques of the disclosure, a cloud-based pregnancy monitoring system receives first and/or second patient data associated with a pregnant mother, applies the first and/or second patient data to one or more trained machine learning models trained to predict maternal and/or fetal health outcomes, and predicts one or more maternal and/or fetal outcomes associated with the pregnant mother based on the first and/or second patient data. The machine learning model(s) are trained using a training data set including patient data and associated outcomes obtained for each of a plurality of patients (e.g., pregnant human mothers and their fetuses). The training data is indicative of features of the patient data that are predictive of one or more maternal or fetal outcomes (either adverse or non-adverse). The training data may be used to generate the one or more machine learning models for the identification of high-risk pregnancies, e.g., prediction of one or more adverse outcomes described herein.

Although specific examples using first patient data such as maternal and/or fetal ECG or heart rate data to predict one or more outcomes are described herein, it shall be understood that the disclosure also applies to prediction of outcomes using any other type of patient data, such as second patient data including other sensed biometric data, socio-economic data, mental health data or any other data relevant to prediction of maternal and/or fetal outcomes, and that the disclosure is not limited in this respect.

The acquired physiological data acquired by the wearable device according to the techniques of the disclosure is input to the trained machine learning model (or models) to predict one or more maternal and/or fetal outcomes. Predicted fetal outcomes may include, but are not limited to, heart defects, fetal arrythmia, fetal cardiac anomalies or other fetal heart conditions, labor, preterm labor, term labor, Apgar scores (e.g., 1, 5 and 10 minutes after birth), cord blood gas pH level, neonatal destination immediately after birth, admission to Neonatal Intensive Care Unit (NICU) within 48 hours of birth, NICU length of stay, resuscitation intervention, other neonatal complications, neonatal death up to 28 days after birth, etc. Predicted maternal outcomes may include, but are not limited to, peripartum cardiomyopathy and/or other maternal heart conditions, labor, preterm labor, term labor, magnesium and/or potassium abnormalities (e.g., hyper or hypo), mode of delivery (e.g., vaginal or C-section), reason for C-section, grade of C-section (if performed—Grades 1, 2, 3 or 4), length of stay, destination immediately after birth, admission to a higher level of care, complications (type and severity), hour of day of delivery, day of week of delivery, etc. The trained machine learning models may further be trained to distinguish between Braxton-Hicks contractions (also referred to as false labor contractions) versus true labor contractions.

In some examples, one or more techniques of the disclosure combine first patient data such as maternal and/or fetal ECG or heart rate data with additional second patient data including biometric data such as uterine contraction data, blood pressure, weight, glucose, pH blood levels, blood oxygen level, breathing rate, patient movement, temperature, patient posture, skin impedance, stress level, bioimpedance spectrum, an acoustic signal patient health assessment data such as results of a mental health assessments, a social determinates of health (SDoH) assessment, data regarding preexisting conditions, patient usage patterns (for example, the timing or update patterns when answering questions on a psychological survey), time of day, frequency or time between measurements, and/or any other patient data relevant to prediction of maternal and/or fetal outcomes for use as training data and/or input data for a current monitoring session for which one or more outcomes are predicted. In some examples, a combination of first patient data and second patient data may improve and/or enhance prediction of outcomes via machine learning or any other suitable techniques. For example, a combination of first and second patient data may provide independent confirmation of first features identified from the first patient data, e.g., via the second patient data and/or features identified from the second patient data, and in some examples thereby improving a confidence level of the confirmed, identified first features. In some examples, a combination of first and second patient data may improve identification of features. For example, second features identified from second patient data may identify a point in time in which to search for first features identifiable from the first patient data. In some examples, a combination of first and second patient data may improve prediction of outcomes via machine learning or any suitable method or algorithm by providing additional second features identifiable from the second patient data which may otherwise not be identifiable from the first patient data. For example, the second patient data may provide additional features not otherwise identifiable from the first patient data because the second patient data is of a different type than the first patient data and/or the first and second patient data result from sensed parameters that are different (e.g., first patient data may result from sensing biopotentials and second patient data may result from sensing body temperature).

The training data may be used to generate one or more ML models for the identification of high-risk pregnancies (e.g., prediction of one or more adverse outcomes described herein). The techniques of the disclosure may help identify false predictions of fetal distress that may lead to unnecessary Cesarean sections, so that unnecessary C-Sections and the associated increase in health care costs and maternal recovery time may be minimized. At the same time, accuracy regarding the prediction of actual fetal distress may be maximized, allowing for timely interventions when needed. The techniques of the disclosure thus provide a comprehensive and accurate monitoring system that takes many types, attributes, features, and/or patterns of fetal and/or maternal data into account when predicting one or more maternal and/or fetal outcomes.

In some examples, the techniques of the disclosure include a first wearable device for acquiring first patient data, e.g., maternal and/or fetal biopotential (such as ECG, EHG, and/or EMG) or heart rate data that a pregnant mother can use at home or other non-clinical environment, which in combination with a cloud-based remote monitoring system (e.g., telehealth and/or telemedicine system), may improve the mother's comfort and peace of mind during pregnancy. The techniques of the disclosure may also include a second device for acquiring second (e.g., additional) patient data, e.g., maternal and/or fetal biometric data. The second device may be a mobile device and/or a wearable device, such as a mobile phone, a watch, or the like, that a pregnant mother can also use at home or other non-clinical environment, which in combination with a cloud-based remote monitoring system (e.g., telehealth and/or telemedicine system), may improve the mother's comfort and peace of mind during pregnancy. The techniques may be used to monitor the health of prenatal and postpartum patients in a remote monitoring setting. The techniques of the disclosure may also be used during labor and delivery in addition to or instead of a traditional cardiotocography (CTG) monitoring device in clinical/hospital environment.

FIG. 1 is a diagram of an example system 100 for the acquisition and communication of first and/or second patient data and/or prediction of maternal and/or fetal outcomes using trained machine learning model(s) in accordance with one or more techniques of the disclosure. In this example, system 100 includes a wearable device 150 including a plurality of sensors 152 configured to sense physiological signals of a patient 180 (a pregnant human mother and/or her fetus). The physiological signals may include, for example, maternal and/or fetal biopotential signals, such as ECG signals or other signals indicative of maternal and/or fetal cardiac activity, EMG and/or EHG signals indicative of uterine activity or contractions, or any other sensed physiological data. System 100 further includes at least one biometric sensing device 250, including one or more sensors 252 configured to sense physiological signals of a patient (a pregnant human mother and/or her fetus). The physiological signals may include, for example, maternal and/or fetal biometric data, such as blood pressure, weight, glucose, pH blood levels, blood oxygen level, breathing rate, patient movement, temperature, a uterine contraction data, a patient posture, a patient movement, a skin impedance, a stress level, a bioimpedance spectrum, or an acoustic signal, and other biometric data. System 100 further includes patient computing device 200, provider computing device(s) 180 and a cloud-based fetal monitoring system (FMS) 300.

In some examples, wearable device 150 includes a wearable (e.g., a garment or a band) configured to be worn about the torso of a pregnant mother 180, one or more sensors 152 affixed or embedded in the wearable, a communications interface, and a controller. The one or more sensors 152 are configured to sense physiological signals, such as one or more biopotential signals of the mother and/or the fetus, such as ECG, EHG, and/or EMG signals. In some examples, the sensed physiological data includes maternal and/or fetal ECG or heart rate data; however, the disclosure is not limited in this respect. Wearable device 150 is configured to wirelessly communicate sensor data representative of the sensed physiological signals for receipt by at least one computing device, such as patient computing device 200. A wearable device controller is configured to control signal acquisition from the one or more sensors 152 and to control wireless communication of the sensor data.

In some examples, biometric sensing device(s) 250 includes one or more sensors 252 configured to sense one or more biometric signals of the mother and/or the fetus, such as blood pressure, weight, glucose, pH blood levels, blood oxygen level, breathing rate, patient movement, temperature, a uterine contraction data, a patient posture, a patient movement, a skin impedance, a stress level, a bioimpedance spectrum, or an acoustic signal, and other biometric data; however, the disclosure is not limited in this respect. A biometric sensing device controller is configured to control signal acquisition from the one or more sensors 252 and to control wireless communication of the sensor data. In some examples, patient computing device 200 may include biometric sensing device 250 and/or one or more sensors 252, and/or patient computing device 200 may be configured to perform the functionality of biometric sensing device(s) 250 and/or one or more sensors 252 described herein. In some examples, biometric sensing device(s) 250 includes one or more biometric sensing devices, and the disclosure is not limited in this respect. Biometric sensing device 250 may include, for example, any one or more of a mobile device such as a mobile phone, a wearable device, such as a watch or smartwatch, a ring or smart ring, a limb sensor, a body sensor, a patch sensor, an ear sensor and/or hearing aid configured to acquire biometric data, a pulse oximeter, a temperature sensor, a bioimpedance sensing device, and/or any other non-invasive or wearable article including one or more sensors or detector configured to acquire biometric data, and the disclosure is not limited in this respect.

Patient computing device 200 is configured for wireless communication with wearable device 150 and/or biometric sensing device 250. For example, patient computing device 200 wirelessly receives the sensor data transmitted by wearable device 150 and biometric data transmitted by biometric sensing device(s) 250. In some examples, patient computing device 200 may include one or more personal computing devices of the patient 180. For example, patient computing device 200 may include a mobile computing device (e.g., smartphone, tablet, or laptop computer), a desktop computer, a smartwatch, etc. Computing device 200 and wearable device 150 may communicate using, for example, the Bluetooth® or Bluetooth® Low Energy (BLE) protocols, near field communication (NFC), Wi-Fi, or any other form of wireless and/or wired communication.

In some examples, patient computing device 200 includes a patient application 208 stored in a memory or other data storage device of patient computing device 208 as a computer-readable medium comprising instructions that when executed by patient computing device 200 generates one or more interactive pages for display on a user interface of patient computing device 200. The one or more interactive pages guide the patient through a monitoring session during which physiological signals are acquired by wearable device 150 and corresponding sensed patient data is communicated from wearable device 150 to patient computing device 200. Example systems and methods for remote pregnancy monitoring and management are shown and described in U.S. patent application Ser. No. 18/060,761, filed Dec. 1, 2022, which is incorporated by reference herein in its entirety.

Patient computing device 200 is further configured to communicate with a variety of other devices or systems via network(s) 130. For example, computing device 200 may be configured to communicate with one or more computing systems, e.g., one or more provider computing devices 180 and/or Fetal Monitoring System (FMS) 300.

FMS 300 includes an AI engine 302, a signal analysis module 304, a patient module 306, and a provider module 308. FMS 300 further includes or is associated with one or more databases or other storage device(s) that store one or more stored machine learning (ML) model(s) 310, patient data 312, sensor data 314, and historical data 316. Sensor data 314 includes the raw data representative of the biopotential signals detected by wearable device 150 and/or biometric sensing device 250 during one or more patient monitoring sessions or at any other time. Patient data 312 includes, for each of a plurality of patients, identification information corresponding to the patient, processed sensor data from one or both of sensors 152 and sensors 252 analyzed or generated by FMS 300 corresponding to one or more patient monitoring sessions or any other time the sensor data is acquired by sensors 152 and sensors 252, and/or one or more predicted outcomes corresponding to the one or more patient monitoring sessions or other acquisition times. Historical data 316 includes historical maternal and/or fetal first and/or second patient data associated with a plurality of patients. FMS 300 executes provider module 308 to provide remote provider-facing fetal monitoring services that support healthcare provider interaction with FMS 300 via provider portal 182 of provider computing system(s) 180. Similarly, FMS 300 executes patient module 306 to provide remote patient-facing fetal monitoring services that support patient interaction with FMS 300 via patient application 208 of patient computing device 200.

In accordance with one or more techniques of the disclosure, AI engine 302 of FMS 300 is configured to train one or more machine learning (ML) model(s) 310 based on historical patient data 316 associated with a plurality of patients to generate one or more maternal and/or fetal outcome predictions. AI engine 302 is further configured to determine, based on processing first and/or second patient data for a pregnant mother using one or more ML models 310 trained with the historical patient data 316, one or more maternal and/or fetal outcome predictions for the pregnant mother. Example systems and methods of training of the one or more machine learning models and or prediction of one or more maternal and/or fetal outcomes are described in U.S. patent application Ser. No. 17/457,206, filed Dec. 1, 2021, and U.S. Provisional Patent Application 63/268,244, filed Feb. 18, 2022, each of which is incorporated by reference herein in its entirety.

Patient computing device(s) 200 may transmit data, including first patient data received from wearable device 150 and second patient data received from biometric sensing device 250, to computing system(s) 180 and/or FMS 300 via network(s) 130. The data may include sensed first and/or second patient data, e.g., values of one or more biopotential signals, such as ECG, EHG, and/or EMG signals, sensed by wearable device 150 and other biometric and/or physiological signals or data sensed or otherwise determined by biometric sensing device 250. FMS 300 may retrieve data regarding patient(s) from one or more sources of electronic health records (EHR) (which may also be referred to as electronic medical records, EMR) 318 via network 130. EHR 318 may include data regarding historical (e.g., baseline) patient data, previous health events and treatments, preexisting conditions, disease states, comorbidities, demographics, height, weight, and body mass index (BMI), as examples, of patients. FMS 300 may use data from EHR 318 to configure algorithms implemented by wearable device 150, biometric sensing device 250, patient computing device 200, and/or FMS 300 to control acquisition of the sensed biopotential signals from wearable device 150 and/or sensed biometric data from biometric sensing device 250 during a monitoring session, or at any other acquisition time, and/or to predict maternal and/or fetal outcomes based on first and/or second patient data acquired during a monitoring session for a patient, or at any other acquisition time.

Network(s) 130 may include one or more computing devices, such as one or more non-edge switches, routers, hubs, gateways, security devices such as firewalls, intrusion detection, and/or intrusion prevention devices, servers, cellular base stations and nodes, wireless access points, bridges, cable modems, application accelerators, or other network devices. Network(s) 130 may include one or more networks administered by service providers and may thus form part of a large-scale public network infrastructure, e.g., the Internet. Network(s) 130 may provide computing devices and systems, such as those illustrated in FIG. 1, access to the Internet, and may provide a communication framework that allows the computing devices and systems to communicate with one another. In some examples, network(s) 130 may include a private network that provides a communication framework that allows the computing devices and systems illustrated in FIG. 1 to communicate with each other but isolates some of the data flows from devices external to the private network for security purposes. In some examples, the communications between the computing devices and systems illustrated in FIG. 1 are encrypted.

Provider computing system 180 includes one or more computing devices used by providers (e.g., physicians, physician assistants, nurses, nurse midwives, pharmacists, therapists, clinical support staff, etc.) to view first and/or second patient data gathered or generated during one or more patient monitoring sessions or at any other acquisition time, including one or more maternal and/or fetal outcome predictions associated with the patient monitoring sessions, for one or more patients. For example, provider computing system 180 may include a provider portal 182 stored in a memory or other data storage device of provider computing system 180 as a computer-readable medium comprising instructions that when executed by provider computing system 180 generates one or more interactive pages for display on a user interface of provider computing system 180 that allow health care providers to view raw and/or processed first and/or second patient data or other data generated by analysis of the patient data, including one or more predicted maternal and/or fetal outcomes, for one or more patients.

Figure 2:
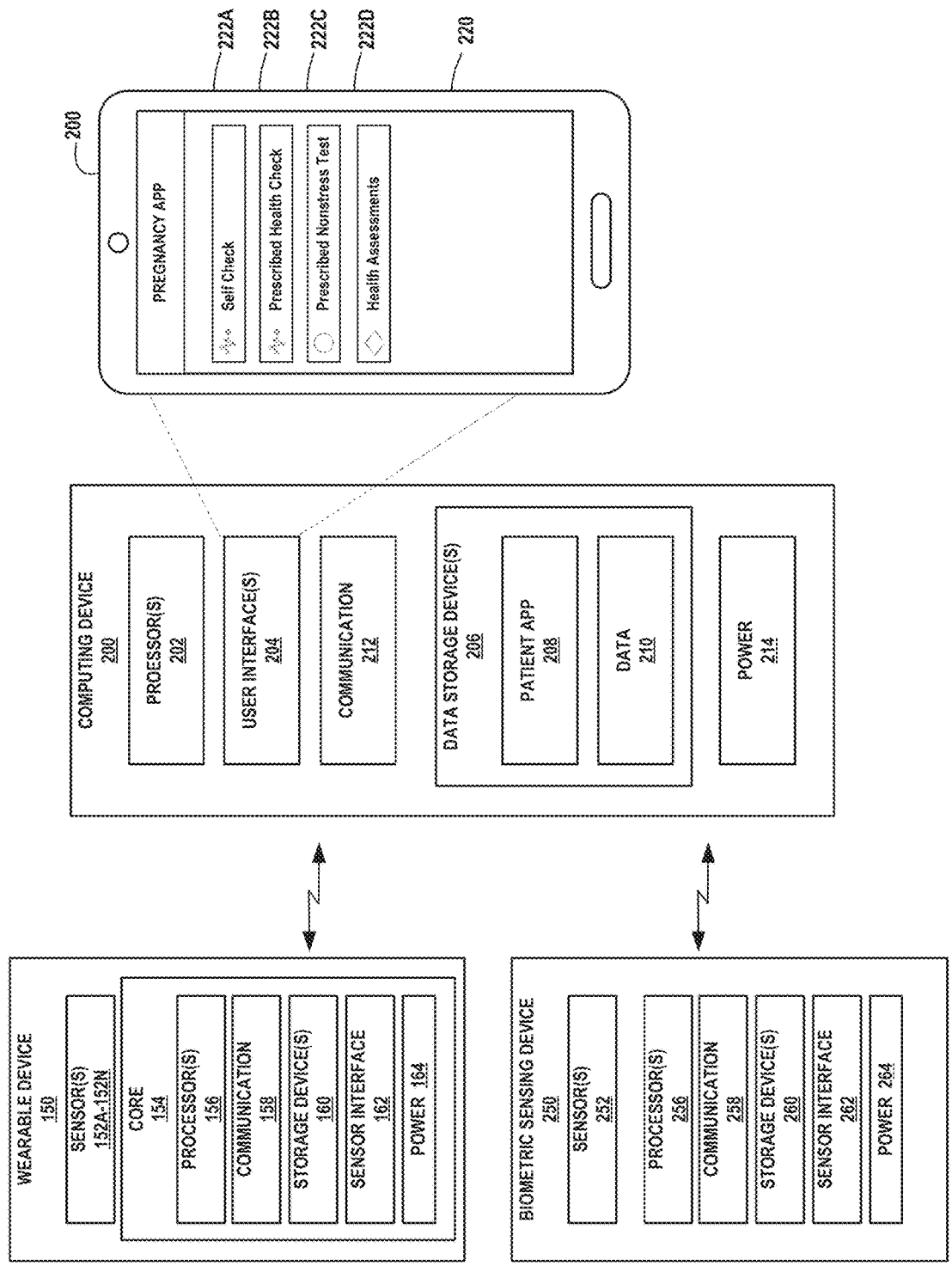
FIG. 2 is a more detailed block diagram of the electronic components of an example wearable device, an example biometric sensing device, and an example patient computing device in accordance with one or more techniques of the disclosure.
Figure 4A:
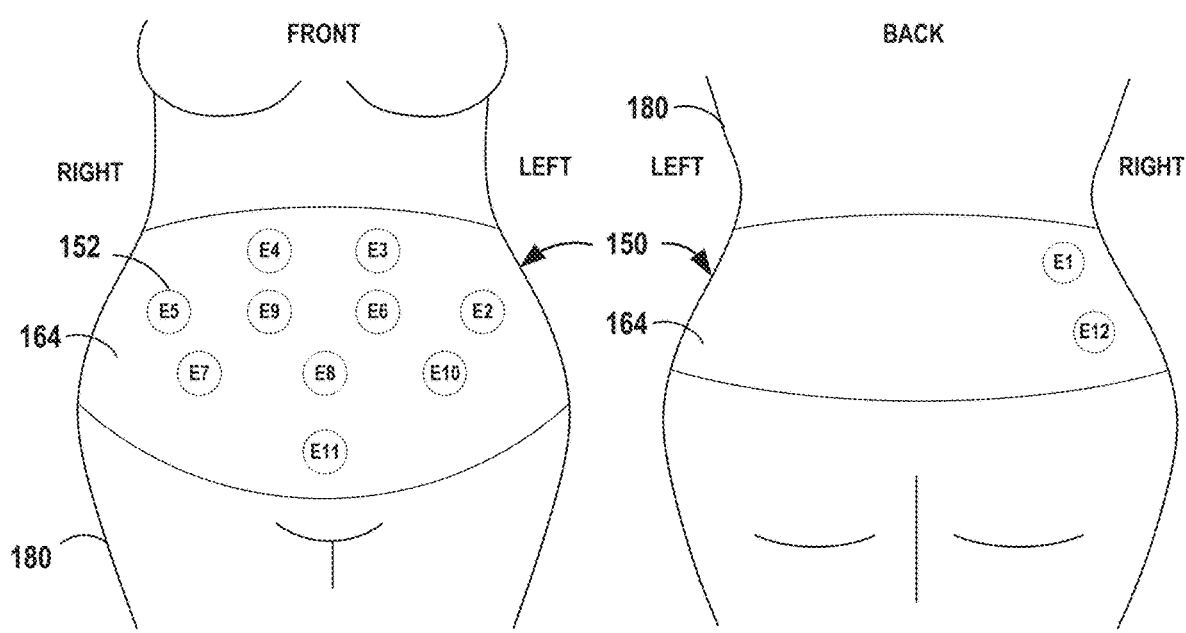
FIG. 4A is a diagram of an example wearable device including a plurality of sensors (e.g., electrodes) embedded or affixed to a wearable garment or band in accordance with one or more techniques of the disclosure.

FIG. 2 is a more detailed block diagram of the electronic components of an example wearable device 150, an example biometric sensing device, and an example patient computing device 200 in accordance with one or more techniques of the disclosure. Wearable device 150 includes one or more sensors 152 (e.g., electrodes) configured to sense physiological signals of a patient, such as maternal and/or fetal biopotential signals, such as ECG, EHG, and/or EMG signals. In some examples, wearable device 150 includes a wearable (e.g., a garment or band 164 such as shown in FIG. 4A) including a plurality of electrodes or other sensing devices 152A-152N affixed to or embedded therein.

In some examples, the sensors 152 are configured to sense maternal and/or fetal ECG signals. In other examples, one or more of the sensors may be configured to sense any one or more of cardiotocography (CTG) signals, electromyography (EMG) signals, electrohysterography (EHG) signals, EMG myometrium signals, pulse oximeter signals, respiratory inductance plethysmography (RIP) (thoracic and abdominal) signals, acoustic signals, actigraphy signals, temperature information, accelerometer or movement information, photoplethysmography (PPG) (e.g., optical measurement for pulse rate and oxygen saturation (SpO2)), and/or any other biopotential or physiological signal or parameter of the patient.

Wearable device 150 further includes control electronics that process the sensed physiological signals of the patient acquired by sensors 152 and communicate the sensed first patient data for receipt by patient computing device 200. In some examples, the control electronics are packaged in a core 154 configured to be removably connected to the wearable garment or band. To that end, core 154 includes one or more processors 156, a communication interface 158, storage devices 160, a sensor interface 162, and a power source 164 (e.g., one or more batteries). Sensor interface 162 includes circuitry configured to receive sensor data corresponding to the physiological signals detected by the one or more sensors 152. Communication interface 158 is configured to support wireless communication between wearable device 150 and one or more computing devices, such as patient computing device 200. Storage devices 160 include one or more hardware memories or other data storage devices configured to store executable control instruction and/or raw sensor 152 data associated with one or more monitoring sessions. Wearable device 150 may store sensor 152 data temporarily during each monitoring session for wireless transmission to a computing device, or wearable device may store sensor 152 data associated with multiple monitoring sessions for later transmission to a computing device.

Biometric sensing device 250 includes one or more sensors 252 configured to sense one or more maternal and/or fetal physiological and/or biometric signals and/or data, such as blood pressure, weight, glucose, pH blood levels, blood oxygen level, breathing rate, patient movement, temperature, a uterine contraction data, a patient posture, a patient movement, a skin impedance, a stress level, a bio-impedance spectrum, or an acoustic signal, and other biometric data. In some examples, biometric sensing device may be a separate device from patient computing device 200, such as a watch or smartwatch, an activity sensor such as a pedometer or the like, an oxygen sensor, or any other suitable device configured to capture biometric signals and/or data. In some examples, patient computing device 200 may include, or be configured to perform the functionality of, biometric sensing device 250. In some examples, biometric sensing device 250 may include, or be configured to perform the functionality of, patient computing device 200.

Biometric sensing device 250 further includes control electronics that process the sensed physiological signals of the patient acquired by sensors 252 and communicate the sensed first patient data for receipt by patient computing device 200. In some examples, biometric sensing device 250 includes one or more processors 256, a communication interface 258, storage devices 260, a sensor interface 262, and a power source 264 (e.g., one or more batteries). Sensor interface 262 includes circuitry configured to receive sensor data corresponding to the sensed physiological signals from the one or more sensors 252. Communication interface 258 is configured to support wireless communication between biometric sensing device 250 and one or more computing devices, such as patient computing device 200. Storage devices 260 include one or more hardware memories or other data storage devices configured to store executable control instruction and/or raw sensor 252 data associated with one or more monitoring sessions. Biometric sensing device 250 may store sensor 252 data temporarily during each monitoring session for wireless transmission to a computing device, or wearable device may store sensor 252 data associated with multiple monitoring sessions for later transmission to a computing device.

Patient computing device 200 includes one or more processor(s) 202, a user interface 204, communication interface 212, data storage devices 206, and a power source 214 (e.g., one or more batteries). In some examples, patient computing device 200 may include one or more personal computing devices of the patient. For example, patient computing device 200 may include a mobile computing device (e.g., smartphone, tablet, or laptop computer), a desktop computer, a smartwatch, etc. Communication interface 212 of patient computing device 200 is configured for wireless communication with wearable device 150. For example, communication interface 212 and communication interface 158 of wearable device 150 may be configured to communicate using, for example, the Bluetooth® or Bluetooth® Low Energy (BLE) protocols, near field communication (NFC), or any other form of wireless communication.

Patient computing device 200 includes a patient application 208 stored in data storage device(s) 206. For example, patient application 208 may include a computer-readable medium comprising instructions that when executed by one or more processor(s) 202 of patient computing device 200 generates one or more interactive pages for display on a user interface 204 of patient computing device 200 that guide the patient through a monitoring session during which physiological signals are acquired by wearable device 150 and/or biometric sensing device 250, and corresponding sensor 152 data and sensor 252 data is communicated to patient computing device 200. As shown in the example of FIG. 2, example patient computing device 200 includes a touch screen display 220 on which one or more interactive pages of a guided patient monitoring session are displayed. Each interactive page may include one or more user interface elements, such as user interface elements 222A-222D, by which a user may interact with patient application 208 (and thus with wearable device 150 and/or FMS 300) to conduct one or more monitoring sessions including a self-check, prescribed health check, prescribed nonstress test, and/or one or more health assessments, such as one or more mental health assessments, social determinants of health assessments, socio-economic assessments, etc. Example systems and methods for remote pregnancy monitoring and management are shown and described in U.S. patent application Ser. No. 18/060,761, filed Dec. 1, 2022, which is incorporated by reference herein in its entirety.

Communication interface 204 of patient computing device 200 is further configured to communicate with a variety of other devices or systems via network(s) 130 (see FIG. 1). For example, computing device 200 may be configured to communicate with one or more computing systems, e.g., one or more of provider computing system 180 and/or FMS 300.

Figure 3:
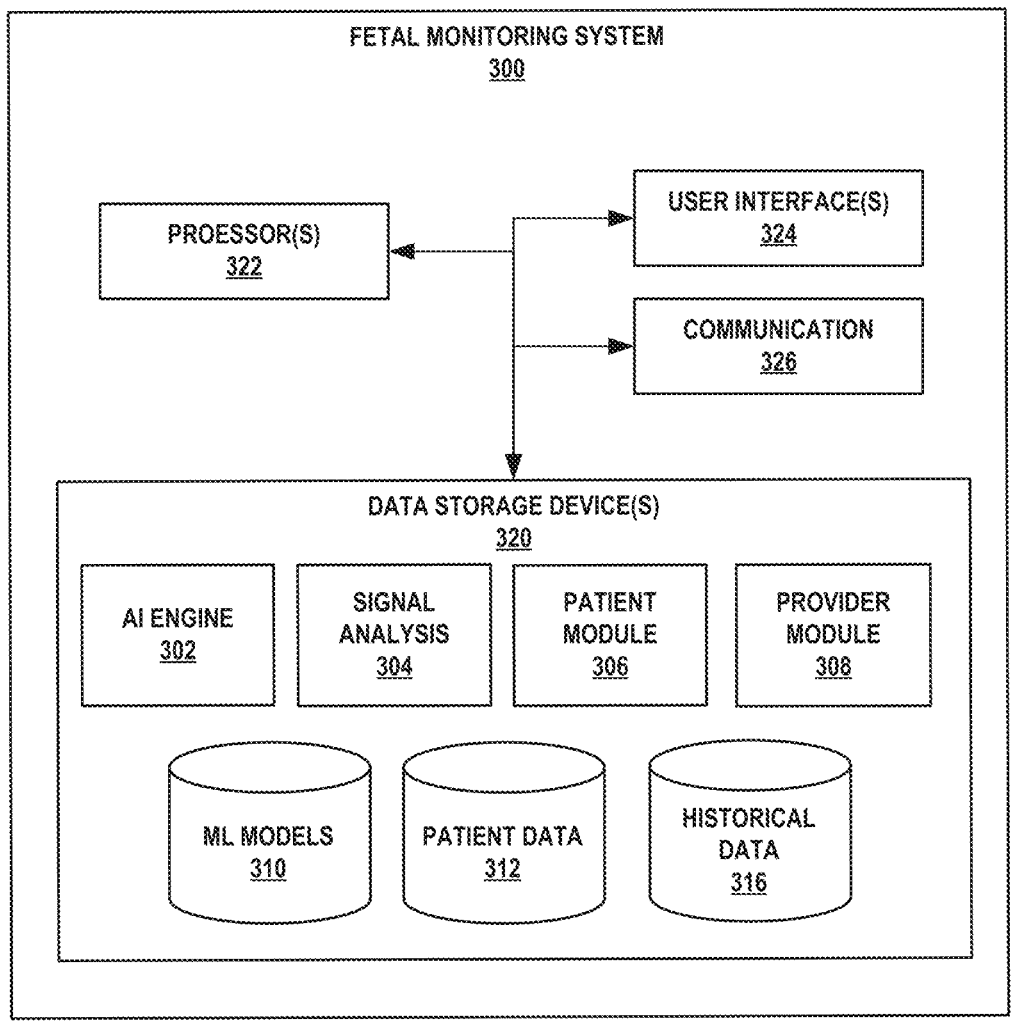
FIG. 3 is a block diagram of an example fetal monitoring system (FMS) in accordance with one or more techniques of the disclosure.

FIG. 3 is a block diagram of an example fetal monitoring system (FMS) 300 in accordance with one or more techniques of the disclosure. FMS 300 includes processing circuitry 322 (e.g., one or more processors 322), user interfaces 324 by which one or more users may interact with FMS 300, communication interfaces 326 which provide for communication with one or more computing devices such as patient computing device 200 and/or provider computing systems 180, and one or more data storage devices 320. Data storage devices 320 include storage for one or more computing modules including AI engine 302, signal analysis module 304, patient app module 306, and provider portal module 308. FMS 300 further includes or is associated with one or more databases or other storage device(s) that store one or more stored machine learning (ML) model(s) 310, patient data 312, and historical data 316. Patient data 312 includes, for each of a plurality of patients, first patient data sensed by wearable device 150 and/or second patient data sensed by biometric sensing device 250 during one or more patient monitoring sessions (or at any time, e.g., in the case of data sensed by biometric sensing device 250), as well as other biometric data associated with the patient and/or patient data obtained during one or more health assessment sessions. Patient data 312 also includes, for each of a plurality of patients, identification information corresponding to the patient, processed sensor data analyzed or generated by FMS 300 corresponding to one or more patient monitoring sessions, and/or one or more predicted outcomes corresponding to the one or more patient monitoring sessions. Historical data 316 includes historical patient data associated with a plurality of patients. Processing circuitry 322 of FMS 300 execute provider module 308 to provide remote provider-facing fetal monitoring services that support healthcare provider interaction with FMS 300 via provider portal 182 of provider computing system(s) 180. Similarly, processing circuitry 322 of FMS 300 execute patient module 306 to provide remote patient-facing fetal monitoring services that support patient interaction with FMS 300 via patient application 208 of patient computing device 200.

Signal analysis module 304 may apply one or more signal processing or preprocessing techniques to the raw sensor data representative of the maternal and/or fetal biopotential signals acquired by the one or more sensors. For example, signal analysis module 304 may apply normalization, denoising, filtering, artifact detection and/or artifact correction to any one or more of the sensed signal data received from the wearable device 150 and/or biometric sensing device 250. Signal analysis modules may also perform feature extraction for first and/or second patient data including for example, extraction of a fetal ECG signal from a mixed maternal-fetal ECG signal, identification of one or more features of the maternal and/or fetal ECG signals including, for example, one or more features of the P wave, QRS complex, T wave, PQ interval, QRS duration, QT interval, RR interval, or other feature indicative of the electrical activity of the heart (e.g., start, end, duration, amplitude, peak-to-peak information, morphology, etc.), oxygen saturation variability (OSV), respiratory rate variability, temperature and movement variability, baseline variability (e.g., of a baseline of any first and/or second patient data or signal derived from first and/or second patient data), activity tracking, sleep quality, heart rate indicative of mental state and/or usable for mental assessment, blood pressure changes, one or more features of a morphology of a biopotential and/or biometric signal including ECG, SpO2, EMG, EHG, PPG, respiration, contractions, and the like. Signal analysis module 304 may further extract one or more features of the maternal and/or fetal heart rate signals including but not limited to, for example, baseline heart rate, baseline variability, fetal heart rate variability, number of accelerations per second, number of early, late, and variable decelerations per second, number of prolonged decelerations per second, sinusoidal pattern, ejection fraction, etc.

FMS 300 executes provider module 308 to provide remote provider-facing fetal monitoring services that support healthcare provider interaction with FMS 300 via provider portal 182 of provider computing system(s) 180. Similarly, FMS 300 executes patient module 306 to provide remote patient-facing fetal monitoring services that support patient interaction with FMS 300 via patient application 208 of patient computing device 200.

In accordance with one or more techniques of the disclosure, AI engine 302, when executed by processing circuitry 322 of FMS 300, is configured to train one or more machine learning (ML) model(s) 310 based on historical patient data 316 associated with a plurality of patients to generate one or more maternal and/or fetal outcome predictions. AI engine 302, when executed by processing circuitry 322, is further configured to determine, based on processing patient data for a pregnant mother using one or more ML models 310 trained with the historical patient data corresponding to a plurality of patients, one or more maternal and/or fetal outcome predictions for the pregnant mother.

Although in the examples described herein FMS 300 is described as performing the training of the ML models 310 and/or application of the models 310 to predict one or more maternal or fetal outcomes, it shall be understood that some or all of the functions described herein as being performed by FMS 300 may be performed by any one or more of wearable device 150, patient computing device 200, provider computing system 180, or any other remote, local or distributed computing device or system, and that the disclosure is not limited in this respect. In addition, the various functions performed by FMS 300 may be implemented using a single computing device or system or they may be distributed across multiple computing devices or systems.

FIG. 4A is a diagram of an example wearable device 150 including a plurality of sensors 152A-152N (labeled E1-E12 and referred to generally as sensors 152) embedded or affixed to a wearable garment 164 in accordance with one or more techniques of the disclosure. In this example, the sensor configuration includes a total of twelve electrodes E1-E12 affixed to or embedded within garment 164 such that, when properly worn about the torso of a patient 180, the electrodes 152 are positioned about the torso of patient 180. One or more of the electrodes 152 may be positioned on the front, left side, right side, and/or back of the patient 180. As shown in FIG. 4A, in some examples, the sensor configuration on garment 164 is such that two electrodes are positioned on the back of patient 180 (E1 and E12 in this example). The number and configuration of sensors 152 on the wearable garment 164 may vary from that shown in FIG. 4A, and the disclosure is not limited in this respect. Examples of such a wearable garment are shown and described in U.S. patent application Ser. No. 18/060,252, filed Nov. 30, 2022, which is incorporated by reference herein in its entirety.

In order to capture maternal and fetal biopotential signals of sufficient quality, sensors 152 should provide good contact with the patient's skin, minimize sensor movement relative to the skin, and reduce signal noise from light movements of the patient. In some examples, sensors 152 include SilverBumps® dry electrodes available from Orbital Research, Inc. Example wearable garments that may be used to implement wearable device 150 are described in U.S. Pat. No. 9,579,055, issued Feb. 28, 2017, which is incorporated by reference herein in its entirety.

In other examples, instead of or in addition to dry electrodes, wearable device 150 may include any other type of sensing material or device to acquire the biopotential signals data, such as nanotechnology sensing devices, textile or silicon-based dry electrodes, nanotube sensors, cardiotocography (CTG) doppler transducers for acquiring signals associated with uterine contractions, and/or any other sensor that may be used to capture maternal and/or fetal biopotential signals.

In accordance with one or more techniques of the disclosure, the physiological (e.g., biopotential) signals sensed by wearable device 150 and analyzed to determine the status of the fetus and/or predict one or more maternal and/or fetal outcomes may include, but are not limited to, fetal heart rate (fHR), maternal heart rate (mHR), fetal ECG, maternal ECG, EHG, and maternal EMG signals.

Figure 4B:
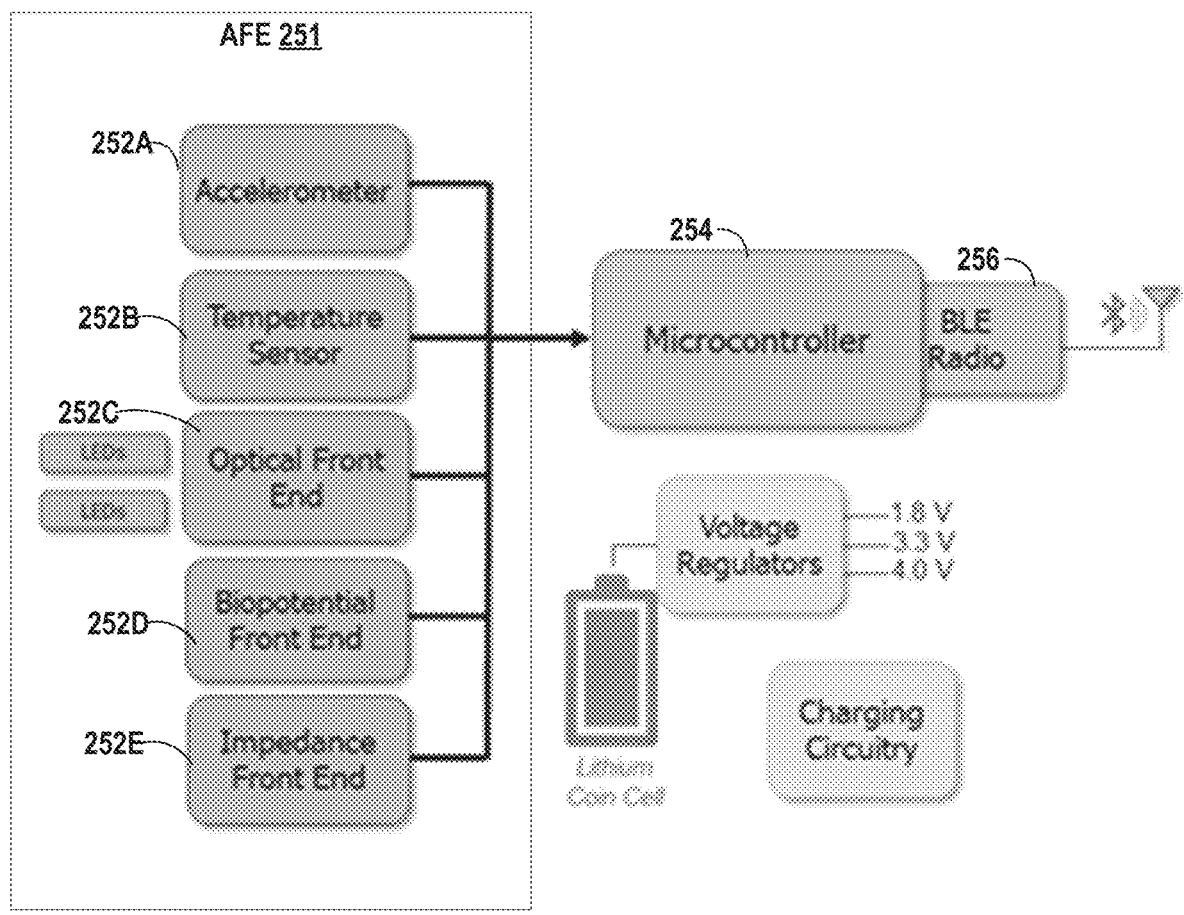
FIG. 4B is a diagram of an example biometric sensing device including a plurality of sensors in accordance with one or more techniques of the disclosure.
Figure 5A:
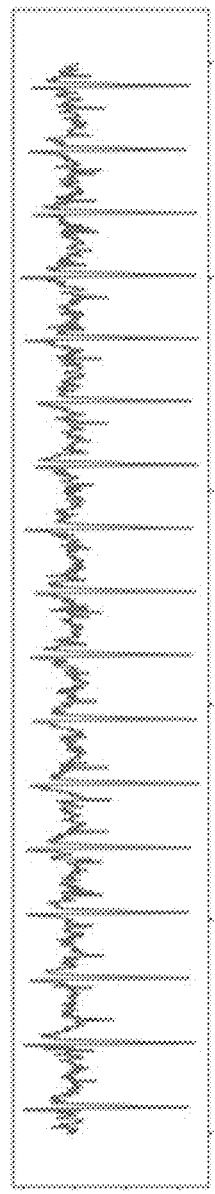
FIGS. 5A-5D are graphs illustrating an example mixed maternal-fetal ECG signal, a fetal ECG signal extracted from the mixed maternal-fetal ECG signal, a graph showing an identification of peaks in the fetal heart rate, and a presentation of fetal heart rate as determined based on the fetal ECG signal, respectively, in accordance with one or more techniques of the disclosure.
Figure 5B:
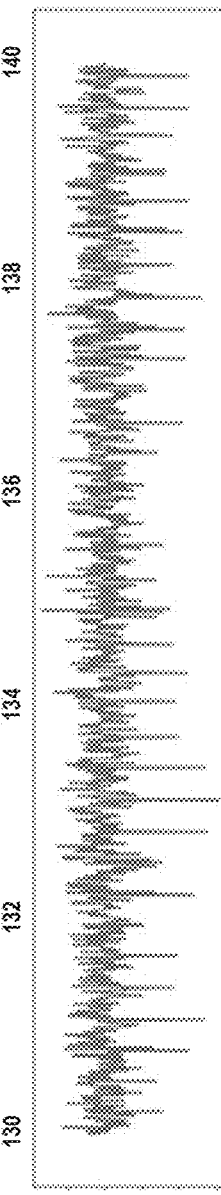
Figure 5C:
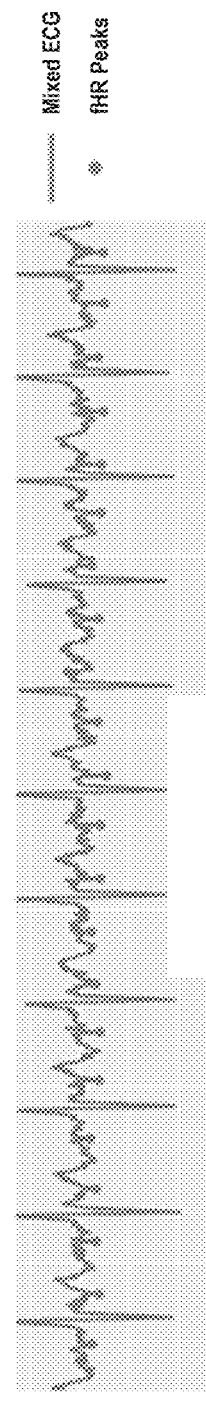
Figure 5D:
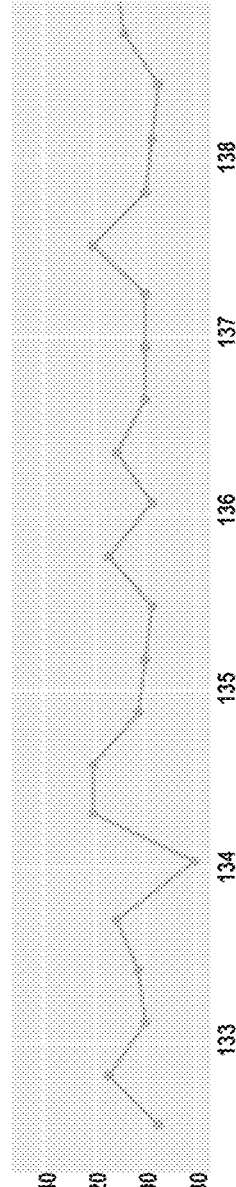

FIG. 4B is a diagram of an example biometric sensing device 250 in accordance with one or more techniques of the disclosure. Example biometric sensing device 250 includes a biopotential analog front end (AFE) 251, including a high-frequency three-axis inertial measurement unit (IMU/accelerometer) 252A, and a clinical-grade thermometer 252B. The biopotential AFE measures respiratory rate by passively reading the electrical impedance changes of the chest. The IMU uses the three-axis accelerometer 252A to measure chest-wall movement. The clinical-grade thermometer 252B measures surface temperature through contact sensing. The new wearable sensor can wrap around the index finger or wrist of the participant to collect PPG and peripheral skin temperature. The wearable sensor may further include an integrated pulse oximetry module 252C, biometric sensing device 250 further includes a microcontroller 254 and wireless transceiver 256 (in this example, a BLE radio) that wirelessly transmits the biometric data acquired by biometric sensing device 250 for receipt by a patient computing device, such as patient computing device 200 or for wireless transmission of the acquired biometric data to FMS 300. The biometric sensing device 250 in combination with wearable device 150 integrates a wireless sensor system applicable across the entire continuum of antepartum care that provides continuous, comprehensive, and non-invasive monitoring (respiratory rate, temperature and pulse oxygenation) compatible with a wide range of mobile devices (e.g., patient computing device 200). The system offers advanced features such as continuous and automated body position classification that may be useful either alone or in combination with biopotential information sensed by wearable device 152 for the monitoring of maternal and/or fetal status both during and post-partum and for the prediction of maternal and/or fetal outcomes.

In general, biometric sensing device 250 includes a plurality of sensors 252A-252E in accordance with one or more techniques of the disclosure. The physiological and/or biometric signals sensed by biometric sensing device 250 and analyzed to determine the status of the fetus and/or predict one or more maternal and/or fetal outcomes may include, but are not limited to, patient posture, position, activity level, steps, and/or movement via an accelerometer and/or inertial measurement unit 252A; patient body temperature and/or patient skin temperature via temperature sensor 252B, oxygen saturation via optical front end sensor and/or pulse oximeter 252C; a biopotential signal via biopotential front end sensor 252D (e.g., at a different body location from wearable device 150); body composition via electrical impedance spectroscopy, respiration rate via thoracic impedance, and stress/emotion via skin impedance measurement via impedance front end sensors 252E.

FIGS. 5A-5D are graphs illustrating an example mixed maternal-fetal ECG signal (FIG. 5A), a fetal ECG signal extracted from the mixed maternal-fetal ECG signal (FIG. 5B), a graph showing an identification of peaks in the fetal heart rate (FIG. 5C), and a presentation of fetal heart rate as determined based on the fetal ECG signal (FIG. 5D), respectively, in accordance with one or more techniques of the disclosure.

To obtain the fetal ECG (FIG. 5B) from the mixed (maternal and fetal) ECG signal (FIG. 5A) that is captured by the wearable device, an extraction algorithm may be employed. Example techniques for extracting a fetal ECG signal (FIG. 5B) from a mixed maternal-fetal ECG signal are described in U.S. Pat. No. 11,224,375, issued Jan. 18, 2022, which is incorporated by reference herein in its entirety.

Figures 6A, 6B, 6C:
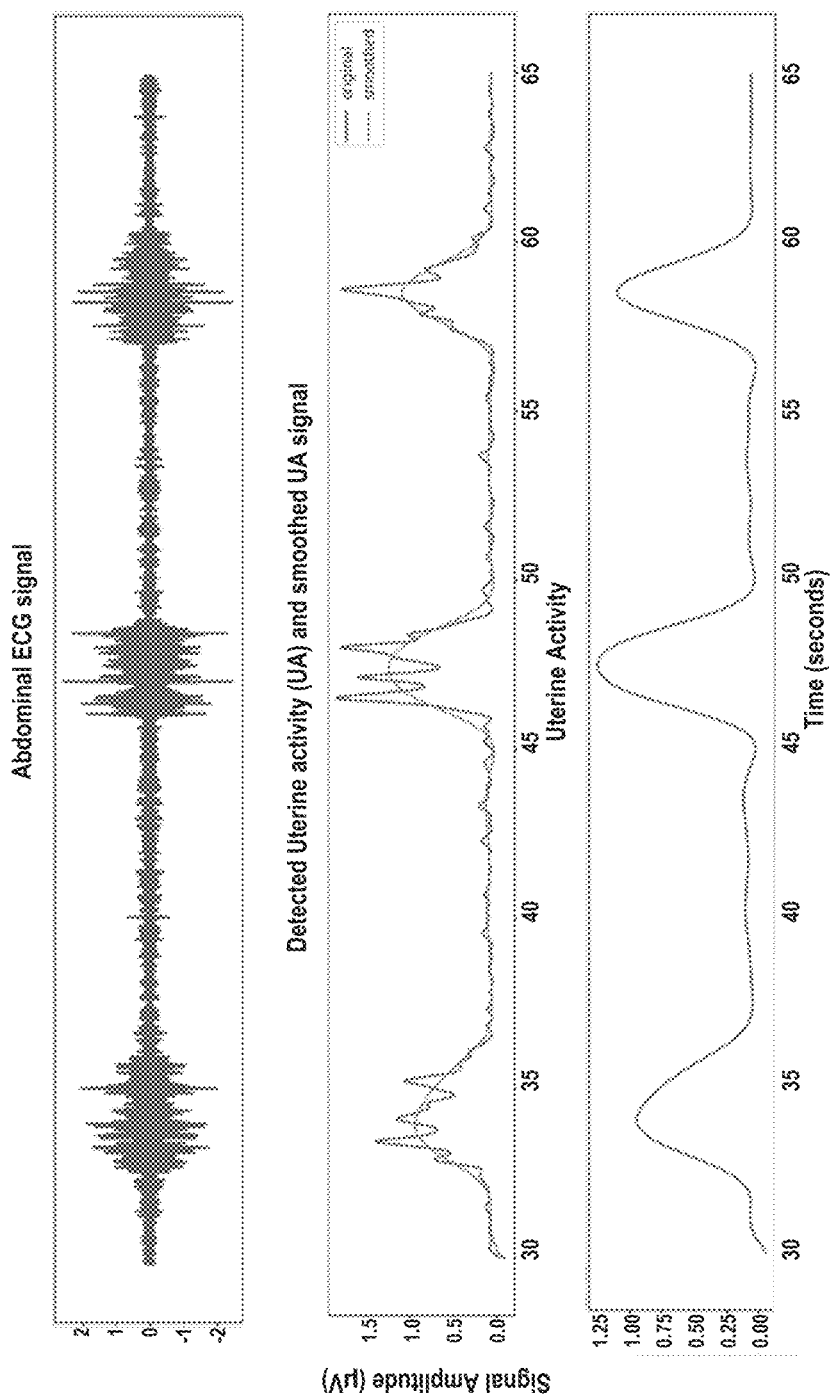
FIGS. 6A-6D are graphs showing an example abdominal signal obtained using the example wearable device, the envelope of the original uterine activity (UA) and smoothed UA signal, the detected uterine activity signal, and an example combined fetal heart rate and uterine signal graph, respectively, in accordance with one or more techniques of the disclosure.

FIGS. 6A-6C are graphs showing an example abdominal (e.g., EMG) signal obtained using the example wearable device 150 as shown in FIG. 4 (FIG. 6A), the envelope of the original uterine activity (UA) and smoothed UA signal (FIG. 6B) and the detected uterine activity signal (FIG. 6C), in accordance with one or more techniques of the disclosure.

Figure 6D:
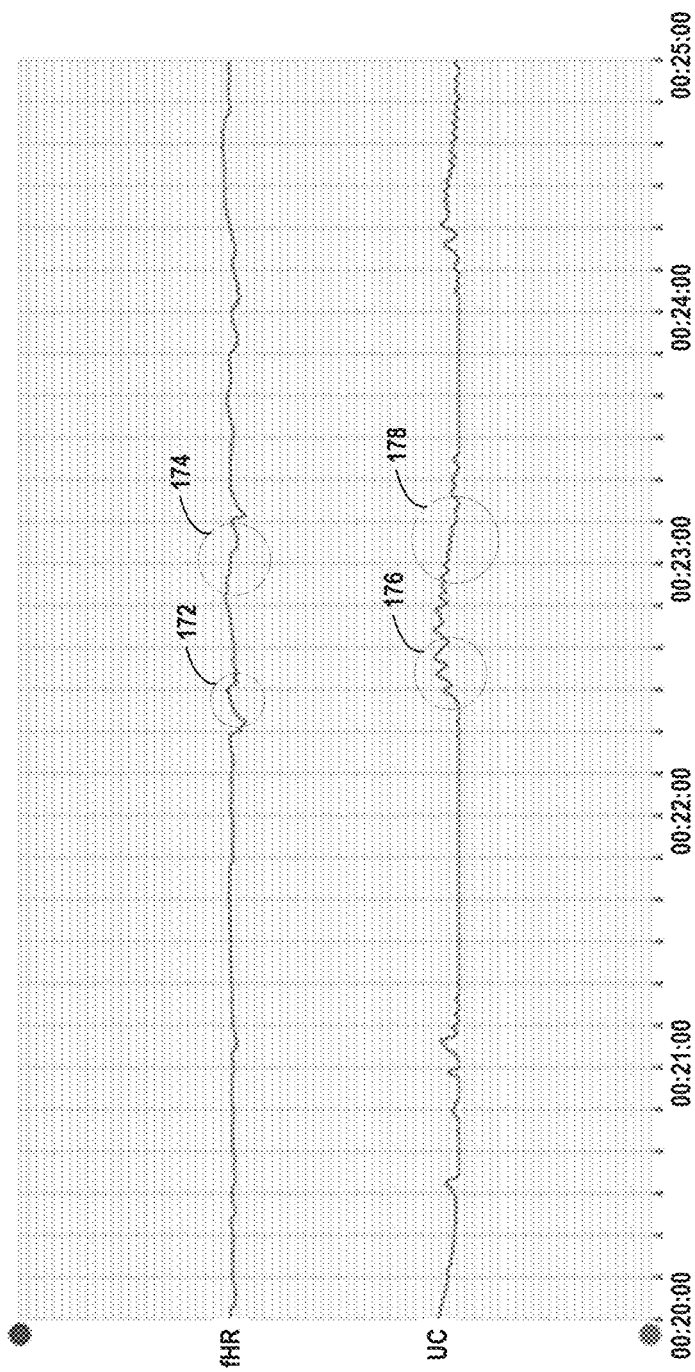

FIG. 6D is a combined fetal heart rate and uterine signal graph in accordance with one or more techniques of the disclosure. Example features of the fetal heart rate signal (upper portion of the graph) are indicated by reference numerals 172 and 174 and example features of the uterine contraction signal (lower portion of the graph) are identified by reference numerals 176 and 178. Reference numeral 172 indicates an acceleration of the fetal heart rate signal that occurred during a first period of time. Reference numeral 174 indicates a deceleration of the fetal heart rate signal that occurred during a second period of time. The detected accelerations/decelerations of the fetal heart rate signal (or the average, mean or other statistical characterization of the detected accelerations/decelerations) may be extracted as a feature that is input to the ML models for the prediction of maternal and/or fetal outcomes. Reference numeral 176 indicates the start of a uterine contraction substantially corresponding to the first period of time during which the fetal heart acceleration indicated by reference numeral 172 occurred. Reference numeral 178 indicates the end of the uterine contraction substantially corresponding to the second period of time during which the fetal heart rate deceleration 174 occurred.

One or more first features of the sensed biopotential signals may be extracted and used as inputs to a machine learning model (such as ML model(s) 310) to predict one or more maternal and/or fetal outcomes. For example, features of the fetal heart rate may include, but are not limited to, baseline heart rate, baseline variability, number of accelerations per second, number of early, late, and variable decelerations per second, number of prolonged decelerations per second, sinusoidal pattern, ejection fraction, etc. Features of the fetal ECG may include, for example, one or more features of the P wave, QRS complex, T wave, PQ interval, QRS duration, QT interval, RR interval, or other feature indicative of the electrical activity of the heart (e.g., start, end, duration, amplitude, peak-to-peak information, morphology, etc.). In another example, analysis of the raw fetal ECG signal may be considered as well to avoid the information loss associated with such feature extraction procedures.

Similar first features may also be identified for the maternal heart rate. Uterine contraction (UC) features (e.g., second features extracted from second patient data such as uterine contraction data) may include baseline uterine tone, contraction frequency, start/end time of uterine contractions, amplitude of uterine contractions, duration of uterine contractions, and strength (intensity) of uterine contractions.

Example features of the fetal heart rate may include, but are not limited to, the features shown in Table 1. Similar features may also be identified with respect to the maternal heart rate.

TABLE 1

Variable Description (fHR)

Fetal heart rate baseline (beats per minute)
Number of accelerations
Number of fetal movements
Number of uterine contractions
Number of moderate decelerations
Number of severe decelerations
Number of prolonged decelerations
Percentage of time with abnormal short-term variability
Mean duration of short-term variability
Mean duration of long-term variability
Percentage of time with abnormal long-term variability
Histogram tendency
Fetal state class code (N = Normal, S = Suspected, P = Pathological)
Width of FHR histogram
Minimum of FHR histogram
Maximum of FHR histogram
Number of histogram peaks
Number of histogram zeroes
Histogram mode
Histogram median
Histogram variance
Amplitude of FHR
Ejection Fraction The first patient data for a particular patient may include first patient data obtained during one or more previous monitoring sessions for the patient for the patient or at any other time, e.g., sensors 152 may continuously (e.g., every millisecond, every second, minute by minute, hourly, daily, or at any suitable acquisition rate) and/or periodically acquire second patient data during monitoring sessions or an any other time, e.g., diurnal and/or nocturnal times, times when the patient is moving and/or still, and the like. The first patient data associated with the previous monitoring sessions may thus be used to establish one or more baselines for the patient. For example, baselines with respect to maternal ECG and/or heart rate, fetal ECG and/or heart rate, etc., may be established and used as first feature inputs to one or more ML models for prediction of maternal and/or fetal outcomes for the patient. In this way, longitudinal information for the patient over time may be taken into account when determining the one or more maternal and/or fetal outcome predictions for the patient.

The second patient data for a particular patient may include second patient data obtained during one or more previous monitoring sessions for the patient or at any other time, e.g., sensors 252 may continuously (e.g., every millisecond, every second, minute by minute, hourly, daily, or at any suitable acquisition rate) and/or periodically acquire second patient data during monitoring sessions or an any other time, e.g., diurnal and/or nocturnal times, times when the patient is moving and/or still, and the like. The second patient data associated with the previous monitoring sessions or other times may be used to establish one or more baselines for the patient. For example, baselines with respect to maternal and/or fetal biopotential signals and/or maternal and/or fetal biometric data such as blood pressure, weight, glucose, pH blood levels, blood oxygen level, breathing rate, patient movement, temperature, a uterine contraction data, a patient posture, a patient movement, a skin impedance, a stress level, a bioimpedance spectrum, or an acoustic signal, and other biometric data, etc., may be established and used as second feature inputs to one or more ML models for prediction of maternal and/or fetal outcomes for the patient. In this way, additional longitudinal information may be combined with longitudinal information from first patient data over time which may be taken into account when determining the one or more maternal and/or fetal outcome predictions for the patient.

Figure 7:
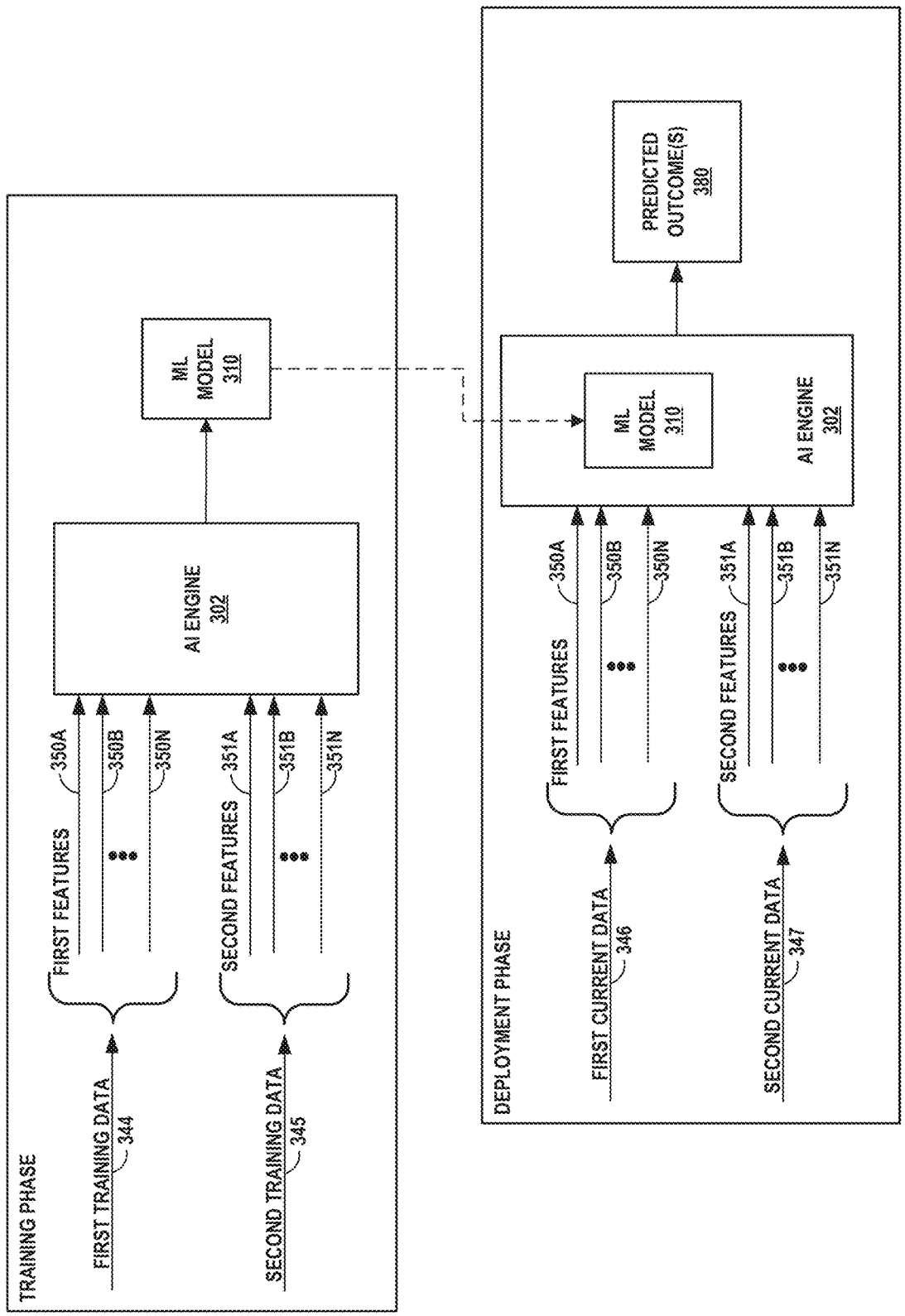
FIG. 7 is a conceptual diagram illustrating an example of training and using a machine learning model that predicts one or more fetal and/or maternal outcomes, in accordance with one or more techniques of the disclosure.

FIG. 7 is a conceptual diagram illustrating an example of training and using a machine learning model that predicts one or more fetal and/or maternal outcomes, in accordance with one or more techniques of the disclosure. The conceptual diagram of FIG. 7 includes AI engine 302 and ML model(s) 310 as shown in FIGS. 1 and 3 and illustrates one example of training and using ML model(s) 310 to predict one or more fetal and/or maternal outcomes. In some examples, AI engine 302 is configured to use supervised or unsupervised machine learning techniques to train one or more ML model(s) 310 to predict one or more fetal or maternal outcomes 380. The techniques of the disclosure result in optimized predictive analytics that detect and classify the patient data received from the wearable device (and/or other patient data such as biometric data, health assessment data, socio-economic data, etc.) using historical data from a plurality of patients, to result in one or more ML models that provide detailed insights into the health of prenatal and postpartum patients, or during labor and delivery.

During a training phase, AI engine 302 receives first training data 344 that includes, for example, historical first patient data associated with a plurality of patients and second training data 345 that includes, for example, historical second patient data associated with the plurality of patients. First training data 344 for a particular patient may include, for instance, values of the maternal and/or fetal ECG or heart rate data obtained during one or more monitoring sessions. First training data 344 may include the raw heart rate trends, pressure measurements as they relate to contractions, and the matched fetal outcomes, maternal outcomes, and data about the subjects. First training data 344 may also include umbilical cord arterial and venous pH levels for hypoxia detection. Second training data 345 for a particular patient may include, for instance, values of the maternal and/or fetal biopotential and/or biometric data obtained during one or more monitoring sessions and/or at any other time. Second training data 345 may include the raw signals and the matched fetal outcomes, maternal outcomes, and data about the subjects. In some examples, second training data 345 may include raw signals such as any signal arising from a measurement or sensed parameter of blood pressure, weight, glucose, pH blood levels, blood oxygen level, breathing rate, patient movement, temperature, a uterine contraction data, a patient posture, a patient movement, a skin impedance, a stress level, a bioimpedance spectrum, or an acoustic signal, and/or any other biometric data or signal.

One or more first features 350A-350N (collectively "first features 350") may be extracted from training data 344 and one or more second features 351A-351N (collectively "second features 351") may be extracted from training data 345. The first features 350 and the second features 351 may include independent and dependent variables. For example, the first features 350 may include any one or more features of the fetal ECG, the maternal ECG, the fetal heart rate, the maternal heart rate, and/or the uterine contractions (e.g., EMG and/or EHG). The second features 351 may also include features of second patient data, e.g., biometric data including blood pressure, weight, glucose, pH blood levels, blood oxygen level, breathing rate, patient movement, temperature, etc., feature of one or more mental health assessments, social determinates of health (SDoH) assessments, socio-economic data, and any other data that may be relevant to a determination of fetal or maternal outcomes.

In some examples, before the modelling takes place, the following features may be extracted from the raw data and used as one or more features of the training data: distribution of gestation week at delivery, distribution of fHR signal duration, percentage of records with validated cord blood gas analysis and pH level for those records, distribution of all fetal outcomes of interest in this study.

First features 350 and/or second features 351 may be selected manually, for example, by a subject matter expert or automatically, for example, by a feature extractor that is part of AI engine 302. A feature extractor may also be used to indicate feature importance or weights for each of the features. Feature importance can be used to determine the relative importance of each feature with respect to the strength of the association of that feature in predicting each of the one or more outcomes 380. The set of features may be refined by performing mathematical, statistical, and heuristic procedures to identify an optimal set of inputs to AI engine 302. One or more of the features may further include one or more known maternal and/or fetal outcomes corresponding to the historical patient data for each of a plurality of patients.

In some examples, according to one or more techniques of the disclosure, AI engine 302 applies a training data set of first features 350 and/or second features 351, and including first patient data 344 and/or second patient data 345 and associated outcomes obtained for each of a plurality of patients to train one or more ML model(s) 310 to predict one or more maternal and/or fetal outcomes. The ML model(s) are indicative of which features of the patient data are predictive of one or more maternal or fetal outcomes (either adverse or non-adverse).

During a deployment phase, the trained ML model(s) 310 may be deployed for use by AI engine 302 to predict one or more fetal and/or maternal outcomes 380 for a particular patient based on one or both of first patient data 346 acquired during a monitoring session or health assessment session for the particular patient or second patient data 347 acquired during a monitoring session or health assessment session for the particular patient or at any other time. During operation, one or more first features 350 are extracted from current first patient data 346 acquired by a wearable device (such as wearable device 150) during the current monitoring session or health assessment session (such as via patient computing device 200 executing patient application 208) and/or one or more second features 351 are extracted from current second patient data 347 acquired by biometric sensing device 250 during the current monitoring session or health assessment session or at any other time. AI engine 302 processes the first features 350 of the current first patient data 346 and/or second features 351 of the current second patient data 347 using machine learning model 310 to generate one or more predicted outcomes 380. In some examples and as shown in FIG. 7, the one or more first features 350 and/or one or more second features 351 received by AI engine 302 during the current session may include one or more of the same first features 350 of the first training data 344 and/or second features 351 of the second training data 345 that were used to train machine learning model 310.

The predicted outcome(s) 380 may be expressed in various ways. For example, the predicted outcome(s) 380 may include predicted future value(s) of one or more fetal and/or maternal biometric or physiological parameter(s). The predicted outcome(s) 380 may include one or more predicted outcome classification(s). The predicted outcome(s) 380 may include a probability that one or more predicted outcomes (e.g., either adverse or non-adverse) will occur at some time in the future. The predicted outcome(s) 380 may further include any one or more of a confidence interval, a confidence level, etc.

In some examples, the first training data 344 includes maternal/fetal ECG and fetal heart rate data and associated outcomes obtained for each of a plurality of patients (e.g., pregnant human mothers and their fetuses), and is used to train and validate machine learning model 310 for maternal and/or fetal outcome prediction. The second training data 345 includes physiological and/or biometric data and associated outcomes obtained for each of the plurality of patients (e.g., pregnant human mothers and their fetuses), and may be used in lieu of, or in addition to first training data 344, to train and validate machine learning model 310 for maternal and/or fetal outcome prediction The machine learning methods are used to determine which maternal and/or fetal ECG or heart rate patterns (e.g., fetal heart rate variability patterns or features) and/or biopotential and/or biometric patterns are predictive of adverse and/or non-adverse outcomes. The model may be tested on portion of the training datasets 344 and/or 345 or on different data sets to compare approaches with the goal of developing ML model(s) 310 that outperform current methods to find patterns related to outcomes imperceptible to human interpretation. The maternal/fetal ECG and/or heart rate measurements, and/or the biopotential and/or biometric measurements, together with the recorded outcomes as well as the patterns determined may be used as training data. The dataset may be split into a development and a holdout/test data set. The development data set may then be further divided into training and internal validation data, then used in real-time for the assessment of fetal heart rate data (such as current first patient data 346), or assessment of physiological and/or biometric data (such as current second patient data 347), to predict one more or more outcomes 380. Hyperparameters such as the batch size, the initial learning rate, the number of neurons in the fully connected layers, and the number of convolutional layers may be adjusted to obtain an optimal model based on the validation set. New maternal and/or fetal heart rate data outside of the original training dataset(s) may be used to update or continuously update the machine learning model. This AI-driven assessment enables continuous improvement of the system and accuracy of the predicted outcomes.

The techniques of the disclosure thus identify first features of, for example, maternal and/or fetal heart rate and/or second features of, for example, physiological and/or biometric data that may help decrease the incidence of adverse perinatal outcomes, including fetal acidemia, fetal hypoxia, and births by Cesarean section (C-section). In this way, the techniques of the disclosure may lead to early intervention intended to address or reduce the impact of predicted adverse events, resulting in improved maternal and fetal outcomes and decreased costs associated with adverse outcomes. This may help to maximize clinical effectiveness and speed to which a clinical team can react to clinical situations where there may be a need for intervention to help a mother and her unborn baby.

Maternal and/or fetal heart rate data can be captured over time using various technologies including, but not limited to, CTG (cardiotocography), fetal scalp electrodes, electrodes that capture fetal ECG (fetal electrocardiogram), acoustic sensors, etc. In some examples, the maternal and/or fetal heart rate data is captured by one or more sensors for capturing maternal/fetal ECG, EHG, and EMG (contractions) signals incorporated into a wearable device such as wearable device 150 as shown in FIGS. 1 and 2.

In accordance with one or more techniques of the disclosure, the system may determine, based on processing patient data associated with a patient using one or more ML model(s) trained with historical patient data, one or more predicted outcomes associated with the patient (such as predicted outcomes 380). The predicted outcomes may include, but are not limited to:

Fetal Outcomes:
  Apgar scores (1, 5 and 10 minutes after birth)
  Cord blood gas pH level
  Neonatal destination immediately after birth
  Admission to Neonatal Intensive Care Unit (NICU) within 48 hours of birth
  NICU length of stay
  Resuscitation intervention
  Other neonatal complications
  Additional adverse fetal outcomes (e.g., growth restriction, reduced fetal movement, delayed or absent cardiac response to fetal movement and contractions, atrial fibrillation, arrhythmia, brady/tachy syndrome, hemolytic disease, birth defect and/or malformations etc.)
  Respiratory adverse outcomes (central, obstructive, mixed apnea, hypopnea, etc.)
  Neonatal death up to 28 days after birth Maternal Outcomes:
  Mode of delivery—vaginal or C-section
  Reason for C-section
  Grade of C-section (If performed—Grades 1, 2, 3 or 4)
  Length of stay
  Destination immediately after birth
  Admission to a higher level of care
  Complications (type and severity)
  Additional adverse outcomes (e.g., preeclampsia, eclampsia, gestational hypertension, maternal pulmonary embolism, peripartum cardiomyopathy, etc.) Additional data may include:
  Hour of day of delivery
  Day of week of delivery In some examples, second training data 345 and/or current second patient data 347 may include any one or more of blood pressure, weight, glucose, pH blood levels, blood oxygen level, breathing rate, patient movement, temperature, mental health assessments, social determinates of health (SDoH) assessment, other data linked to clinical data, and/or any other biometric data or data relevant to prediction of maternal and/or fetal outcomes. This training data may be used to generate the ML models for the identification of high-risk pregnancies (e.g., prediction of one or more adverse outcomes described herein). By including additional parameters, false predictions of fetal distress that may lead to unnecessary Cesarean sections may be minimized. At the same time, accuracy regarding the prediction of actual fetal distress may be maximized, allowing for timely interventions when needed. The techniques of the disclosure thus provide a comprehensive and accurate monitoring system that takes many attributes, features, and/or patterns of fetal and/or maternal heart rate into account when predicting one or more maternal and/or fetal outcomes.

Different machine learning classification models may be trained using the training data. Sensitivity, precision, and F1 score for each class and overall accuracy of each model may be obtained to predict normal, suspect, and pathological states. The ML model with the best performance on specified metrics will be then identified and reported for each identified outcome. The ML model(s) are stored as ML models 310 and used for prediction of fetal and/or maternal outcomes 380 during a current monitoring session or based on previously monitored data acquired during a session of interest.

For example, a first ML model may be trained to predict a preterm labor risk. A second ML model may be trained to predict a preeclampsia risk. A third ML model may be trained to predict a C-section risk related to preeclampsia, diabetes, and/or body mass index (BMI). A fourth ML model may be trained to predict "high-risk" pregnancies. Similarly, one or more additional ML models may be trained to predict one or more outcomes. In this way, multiple ML models may be generated, each associated with one or more adverse or non-adverse outcomes. The ML models may be stored (e.g., as ML model(s) 310 as shown in FIGS. 1 and 2 and/or ML model 310 as shown in FIG. 7) and applied to patient data obtained during a current monitoring session (or applied to patient data acquired during a previously conducted monitoring session) to predict one or more adverse or non-adverse outcomes.

Figure 8:
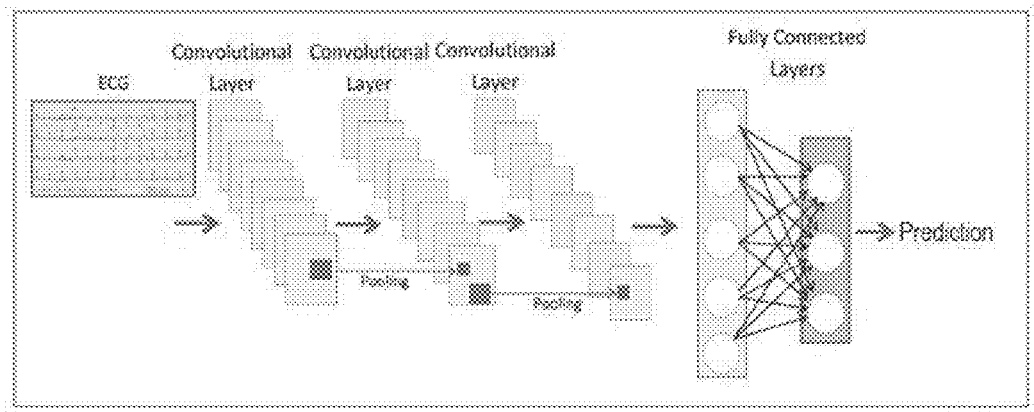
FIG. 8 shows an example visualization of a convolutional neural network (CNN) for classification (e.g., prediction) using ECG signal data.

In some examples, the techniques of the disclosure develop prediction models using any one or more of generalized or specialized machine learning applications. These may include, for example, any one or more of random forest (RF), radial basis function (RBF) kernel support vector machine (SVM), linear SVM, linear regression and/or logistic regression techniques. The machine learning techniques may further include any one or more of deep multilayer perceptrons (MLP), convolutional or deep convolutional neural networks (CNN), recurrent neural networks (RNN), long short-term memory neural networks (LSTM), artificial neural network (ANN), deep belief networks (DBN), Bayesian networks, autoregressive models, fuzzy-logic systems, hidden Markov models (HMM), Gaussian process models, transformer learning models, etc. In one example, the techniques of the disclosure develop prediction models using a Convolutional Neural Network (CNN) and/or a Recurrent Neural Network (RNN) approach based on the Keras Framework with a Tensorflow® (Google, Mountain View, CA) backend. In the example of a CNN, a CNN consists of an input and an output layer, as well as multiple hidden layers. Hidden layers of a CNN typically include convolutional layers, pooling layers and fully connected layers that are used to extract features. During training of a CNN, for example, the weights of the convolutional filters may be adjusted to extract meaningful and relevant features in an unsupervised way, and each task may be defined by the outcome to be predicted. FIG. 8 shows an example visualization of a convolutional neural network (CNN) for classification (e.g., prediction) using ECG signal data.

Figure 9:
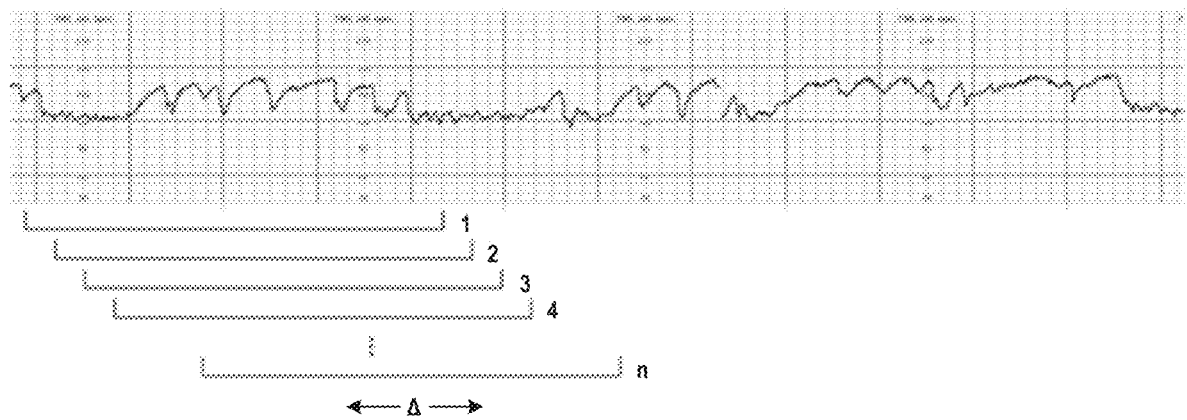
FIG. 9 shows an example segmentation batch using a thumbing window.

In some examples, before continuous data, such as fetal heart rate recordings, are used as input for any of the techniques described above, they undergo a segmentation procedure. Each recording is randomly partitioned in n different ways into recordings of length A. FIG. 9 shows an example segmentation batch using a thumbing window. The exact sizes of A and n are subject to optimization during the project. It may also be necessary to develop a "smart" way of segmenting recordings if the randomized approach does not deliver satisfactory results (in relation to its computational cost).

Figure 10:
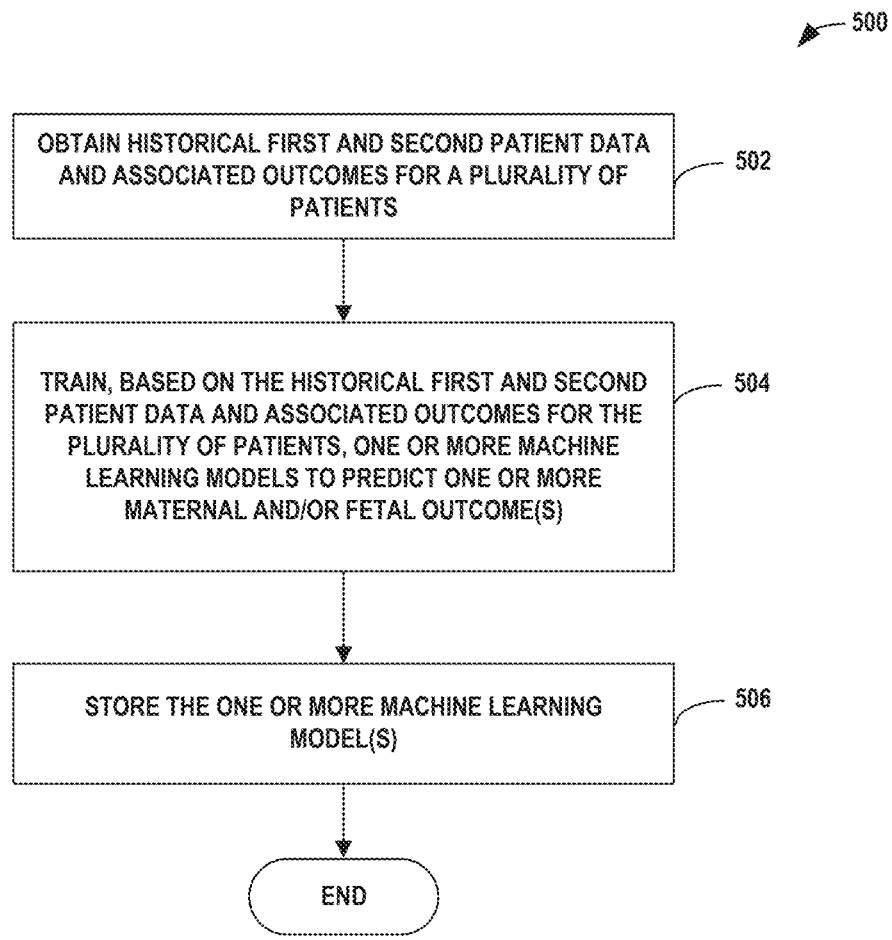
FIG. 10 is a flow chart illustrating an example process by which a computing device may train one or more machine learning models to generate one or more maternal and/or fetal outcome predictions in accordance with one or more techniques of the disclosure.

FIG. 10 is a flow chart illustrating an example process (500) by which a computing device, such as one or more processor(s) 302 of FMS 300, may train one or more machine learning models to generate one or more maternal and/or fetal outcome predictions in accordance with one or more techniques of the disclosure. The computing device obtains first patient data and associated outcomes and second patient data for a plurality of patients (502). The computing device trains, based on the historical first and/or second patient data and associated outcomes for a plurality of patients, one or more machine learning models to predict one or more maternal and/or fetal outcomes (504). The computing device stores, for example, as ML models 310 as shown in FIGS. 1 and 3, the one or more machine learning models for later prediction of one or more maternal and/or fetal outcomes (506).

Figure 11:
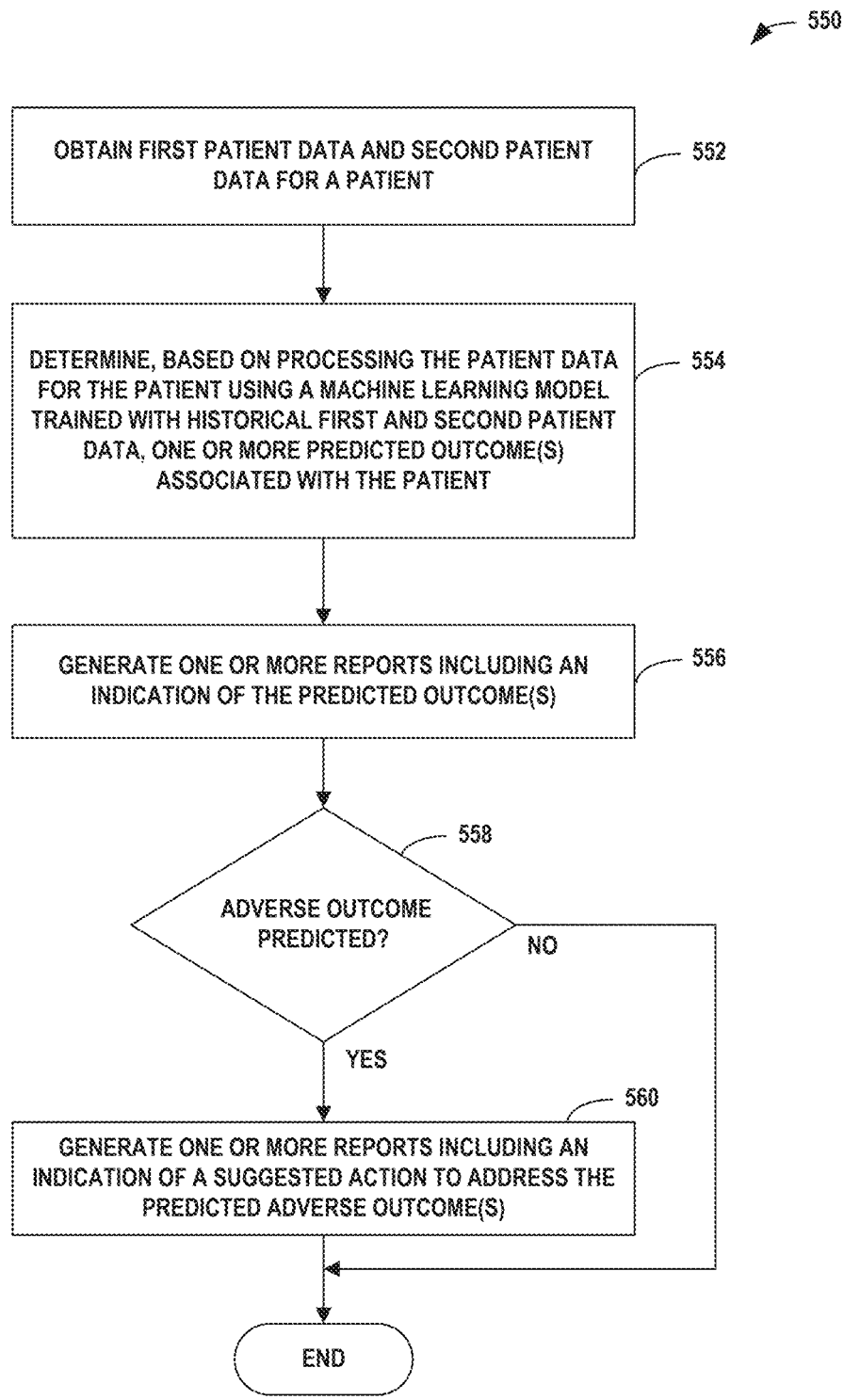
FIG. 11 is a flow chart illustrating an example process by which a computing device may predict one or more maternal and/or fetal outcomes in accordance with one or more techniques of the disclosure.

FIG. 11 is a flow chart illustrating an example process (550) by which a computing device, such as one or more processor(s) 302 of FMS 300, may generate one or more maternal and/or fetal outcome predictions in accordance with one or more techniques of the disclosure. The computing device obtains first patient data for a patient acquired during a patient monitoring session, and the computing device obtains second patient data for the patient acquired during the monitoring session or at any other time (552). The computing device determines, based on processing the first and second patient data for the patient using a machine learning model trained with historical first and second patient data for a plurality of patients, one or more predicted maternal and/or fetal outcomes associated with the patient (554). The computing device may generate one or more reports including an indication of the predicted outcomes for display on one or more computing devices (558). For example, the computing device may execute a patient module (such as patient module 306) or a provider module (such as provider module 308) to generate the one or more reports for display on a patient computing device or a provider computing system, respectively.

The computing device may further determine if the predicted outcome is an adverse outcome (558). If the predicted outcome is not an adverse outcome (NO branch of 558), the process of predicting one or more maternal or fetal outcomes for the monitoring session is complete. If the predicted outcome is an adverse outcome (YES branch of 558), the computing device may generate one or more reports including an indication of a suggested action or actions that may be taken to address the predicted adverse outcome(s) (560). For example, the suggested actions for a patient may include a suggestion that the patient change one or more habits, a suggestion that the patient contact their healthcare provider, a suggestion that the patient change the frequency of their monitoring sessions, etc. As another example, the suggested actions for a provider may include a diagnostic suggestion, an intervention suggestion, a care plan suggestion, etc.

As one specific example of process (550) of FIG. 10, a computing device, such as one or more processor(s) 302 of FMS 300, may train one or more machine learning models to generate a predicted increase in fetal pH blood levels, in accordance with one or more techniques of the disclosure. The computing device obtains historical maternal and/or fetal ECG or heart rate data as well as historical maternal and/or fetal biopotentials and/or biometric data, and associated known outcomes for a plurality of patients (502). The associated known outcomes include an increase in fetal pH blood levels for a plurality of patients. The computing device trains, based on the historical maternal and/or fetal ECG or heart rate data and biopotentials and/or biometric data and associated known outcomes including increases in fetal pH blood levels for the plurality of patients, one or more machine learning models to predict one or more maternal and/or fetal outcomes (504). The computing device stores, for example, as ML models 310 as shown in FIGS. 1 and 3, the one or more machine learning models for later prediction of one or more maternal and/or fetal outcomes, including the prediction of the increase in fetal pH blood levels (506).

In some examples, certain features of the fetal heart rate satisfying respective threshold(s) may be correlated to an increase in fetal pH blood levels and thus processed by the associated ML model to predict an increase in fetal pH blood levels. For example, an increase in the fetal heart rate satisfying one or more thresholds may be determined during training of the ML model to be correlated to a predicted increase in fetal pH blood levels. The one or more thresholds may include, for example, a specified increase/decrease in the frequency of the fetal heart rate, a specified increase/decrease in the amplitude of the fetal heart rate, a specified increase/decrease in the frequency of the fetal ECG signal, a specified increase/decrease in the amplitude of the fetal ECG signal, etc. In addition, a prediction of an increase in fetal pH blood levels may be further correlated to a predicted risk of preeclampsia and/or C-section outcomes. Conversely, training of the one or more ML models may reveal that certain features or combinations of features are indicative that a C-section is not indicated. In such cases, unnecessary C-sections and associated medical costs, along with increased recovery time for the mother, may be avoided.

Figure 12:
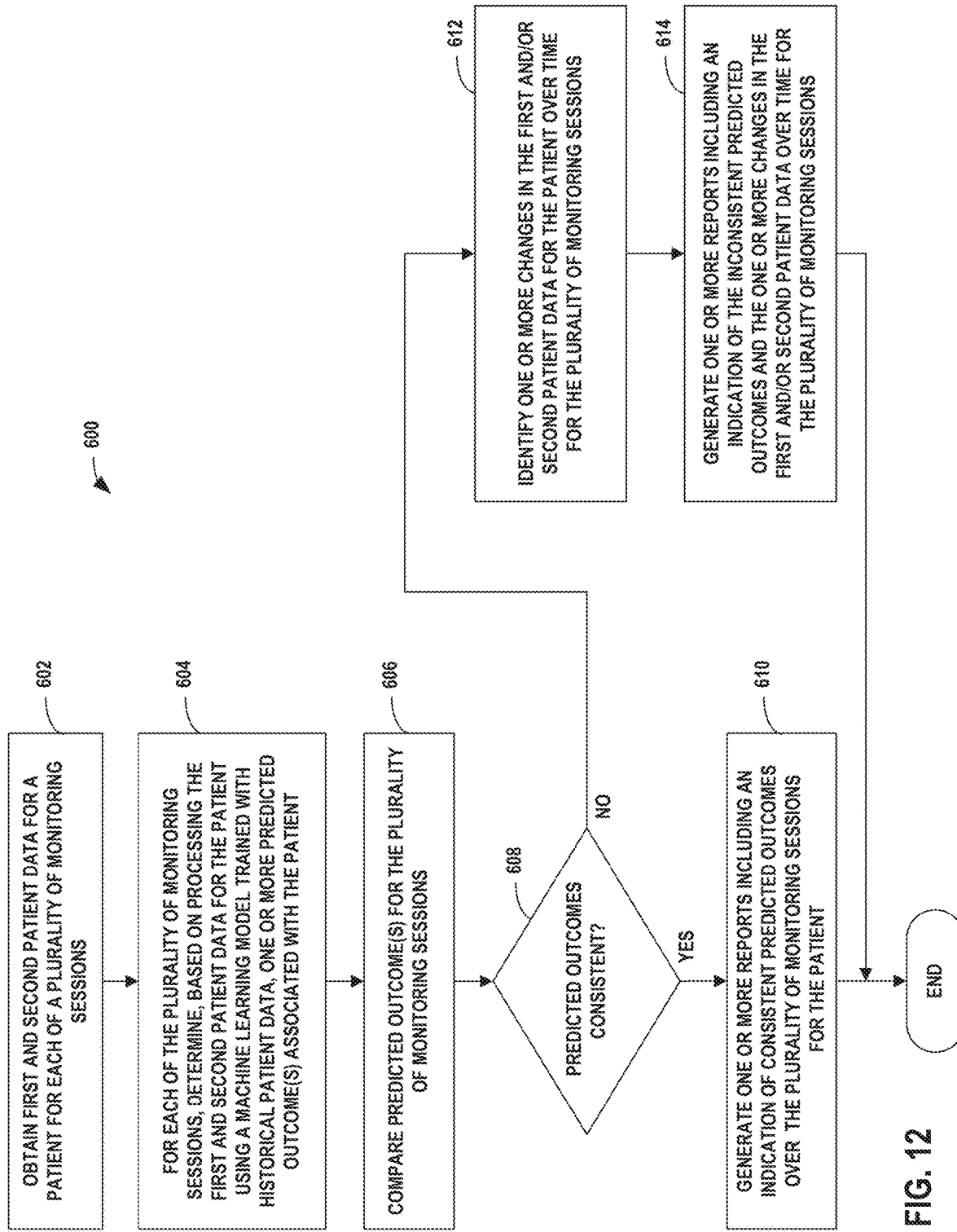
FIG. 12 is a flow chart illustrating an example process by which a computing device may generate one or more maternal and/or fetal outcome predictions based on longitudinal tracking of a particular patient in accordance with one or more techniques of the disclosure.

FIG. 12 is a flow chart illustrating an example process (600) by which a computing device, such as one or more processor(s) 302 of FMS 300, may generate one or more maternal and/or fetal outcome predictions based on longitudinal tracking of first and second patient data for a particular patient in accordance with one or more techniques of the disclosure. The computing device obtains first and second patient data for a patient acquired for each of a plurality of patient monitoring sessions (602). For each of the plurality of monitoring sessions, the computing device determines, based on processing the first and second patient data for the patient using a machine learning model trained with historical maternal and/or fetal ECG or heart rate data and biopotentials and/or biometric data for a plurality of patients, one or more predicted maternal and/or fetal outcomes associated with the patient (604). The computing device compares the one or more predicted outcomes determined during each of the plurality of monitoring sessions with the one or more predicted outcomes determined during the remaining plurality of monitoring sessions (606). The purpose of the comparison is to monitor the predicted outcomes for a patient longitudinally over time (e.g., over a plurality of monitoring sessions) to determine whether each predicted outcome is consistent with one or more previous or subsequent predicted outcomes (e.g., predicted outcomes determined for a previous or subsequent monitoring session). If the predicted outcomes determined over time for the plurality of monitoring sessions are consistent (YES branch of 608), the computing device generates one or more reports including an indication of the consistent predicted outcomes for the patient determined over the plurality of monitoring sessions (610).

In some examples, the computing device may compare first and second patient data obtained during a current monitoring session to corresponding baseline(s) established for the patient based on first and second patient data obtained during one or more previous monitoring sessions. In some examples, the computing device may compare one or more maternal and/or fetal outcomes predicted based on data obtained during a current monitoring session to corresponding baseline(s) established for the patient based on one or more maternal and/or fetal outcomes predicted based on data gathered during one or more previous monitoring sessions.

If one or more of the predicted outcomes determined over time for the plurality of monitoring sessions is not consistent (NO branch of 608), the computing device identifies one or more changes in the first and/or second patient data for the patient over time for the plurality of monitoring sessions (612). The purpose of identifying these changes is to determine whether any of those changes may have resulted in the inconsistency in the predicted outcomes. For example, if a change to fetal heart rate variability (or any other feature(s) or parameter(s)) is detected from a first monitoring session to a second monitoring session, this may account for the change in one or more predicted outcomes from the first monitoring session as compared to the second monitoring session. The computing device generates one or more reports including an indication of the inconsistent predicted outcomes for the patient determined over time for the plurality of monitoring sessions and the one or more changes in the data detected over time for the plurality of monitoring sessions (614). By so doing, the techniques of the disclosure inform the clinicians/providers that changes to the health status of the mother and/or the fetus have occurred, facilitating rapid interventions if necessary, and helping to improve pregnancy outcomes for both mother and fetus.

The process (600) may be repeated each time another monitoring session is performed to continue longitudinal monitoring of the patient.

The following numbered clauses may demonstrate one or more aspects of the disclosure.

Clause 1: A system includes a first wearable device configured to be worn by a pregnant patient, the first wearable device further includes a plurality of electrodes configured to sense a first patient data associated with the patient and her fetus; a second device configured to sense a second patient data associated with the patient and her fetus; and a computing device configured to: obtain the first patient data from the first wearable device; obtain the second patient data from the second device; identify one or more first features of a maternal or a fetal heart rate signal determined from the first patient data; identify one or more second features of a maternal biometric signal or a fetal biometric signal determined from the second patient data; determine, based on applying the one or more first features and the one or more second features as inputs to a machine learning model trained with historical first patient data and historical second patient data, one or more predicted outcomes associated with the patient; and generate one or more reports including an indication of the one or more predicted outcomes for display on one or more of a patient computing device or a provider computing device.

Clause 2: The system of clause 1, wherein the first patient data comprises a maternal electrocardiography (ECG) or heart rate data or a fetal electrocardiography (ECG) or heart rate data, wherein the second patient data comprises other maternal biometric data or other fetal biometric data.

Clause 3: The system of clause 2, wherein the other maternal biometric data or other fetal biometric data comprises at least one of a blood pressure, a weight, a glucose level, a pH blood level, a blood oxygen level, a breathing rate, a temperature, a uterine contraction data, a patient posture, a patient movement, a skin impedance, a stress level, a bioimpedance spectrum, or an acoustic signal.

Clause 4: The system of clause 3, wherein the computing device is configured to obtain the other maternal biometric data or other fetal biometric data continuously.

Clause 5: The system of any one of clauses 1 through 4, wherein the computing device is configured to obtain the first patient data or the second patient data nocturnally.

Clause 6: The system of any of one clauses 1 through 5, wherein the first wearable device further comprises a wearable band configured to be worn about the torso of the patient, wherein the plurality of electrodes are affixed to or embedded in the wearable band, wherein the second device comprises at least one of a mobile device configured to sense the second patient data, a smart watch configured to sense the second patient data, a limb sensor configured to sense the second patient data, or a body sensor configured to sense the second patient data.

Clause 7: The system of any one of clauses 1 through 6, wherein the second device is a wearable device.

Clause 8: The system of any one of clauses 1 through 7, wherein the second device comprises at least one of a temperature sensor, an accelerometer, a pulse oximeter, a biopotential sensor, or an impedance sensor.

Clause 9: The system of any one of clauses 1 through 8, wherein the one or more first features comprise at least one of a baseline heart rate, a baseline variability, a number of accelerations per second, a number of early, late, and variable decelerations per second, a number of prolonged decelerations per second, a sinusoidal pattern, an ejection fraction, a P wave, a QRS complex, a T wave, a PQ interval, a QRS duration, a QT interval, or an RR interval.

Clause 10: The system of any one of clauses 1 through 9, wherein the one or more predicted outcomes include at least one of an Apgar score 1, 5 and 10 minutes after birth, a cord blood gas pH level, a neonatal destination immediately after birth, an admission to Neonatal Intensive Care Unit (NICU) within 48 hours of birth, a NICU length of stay, a resuscitation intervention, a neonatal death up to 28 days after birth, a maternal pulmonary embolism, a peripartum cardiomyopathy, a fetal academia, or an arrhythmia.

Clause 11: The system of any one of clauses 1 through 10, wherein the machine learning model comprises at least one of a convolutional neural network, a deep convolutional neural network, a random forest, a radial basis function (RBF) kernel support vector machine (SVM), a linear SVM, a linear regression, a logistic regression, a deep multilayer perceptron, a recurrent neural network, a long short-term memory neural network, an artificial neural network, a deep belief network, a Bayesian network, an autoregressive model, a fuzzy-logic system, a hidden Markov model, a Gaussian process model, or a transformer learning models.

Clause 12: A method of generating a maternal or fetal outcome prediction includes obtaining, by processing circuitry, first patient data from the first wearable device; obtaining, by processing circuitry, second patient data from the second device; identifying, by processing circuitry, one or more first features of a maternal or a fetal heart rate signal determined from the first patient data; identifying, by processing circuitry, one or more second features of a maternal biometric signal or a fetal biometric signal determined from the second patient data; determining, by processing circuitry and based on applying the one or more first features and the one or more second features as inputs to a machine learning model trained with historical first patient data and historical second patient data, one or more predicted outcomes associated with the patient; and generating, by processing circuitry, one or more reports including an indication of the one or more predicted outcomes for display on one or more of a patient computing device or a provider computing device.

Clause 13: The method of clause 12, wherein the first patient data comprises a maternal ECG or heart rate data or a fetal ECG or heart rate data, wherein the second patient data comprises other maternal biometric data or other fetal biometric data.

Clause 14: The method of clause 13, wherein the other maternal biometric data or other fetal biometric data comprises at least one of a blood pressure, a weight, a glucose level, a pH blood level, a blood oxygen level, a breathing rate, a temperature, a uterine contraction data, a patient posture, a patient movement, a skin impedance, a stress level, a bioimpedance spectrum, or an acoustic signal.

Clause 15: The method of clause 14, wherein the processing circuitry obtains the other maternal biometric data or other fetal biometric data continuously.

Clause 16: The method of any of clauses 12 through 15, wherein the processing circuitry obtains the first patient data or the second patient data nocturnally.

Clause 17: The method of any one of clauses 12 through 16, wherein the one or more first features comprises at least one of a baseline heart rate, a baseline variability, a number of accelerations per second, a number of early, late, and variable decelerations per second, a number of prolonged decelerations per second, a sinusoidal pattern, an ejection fraction, a P wave, a QRS complex, a T wave, a PQ interval, a QRS duration, a QT interval, or an RR interval.

Clause 18: The method of any one of clauses 12 through 17, wherein the one or more predicted outcomes include at least one of an Apgar score 1, 5 and 10 minutes after birth, a cord blood gas pH level, a neonatal destination immediately after birth, an admission to Neonatal Intensive Care Unit (NICU) within 48 hours of birth, a NICU length of stay, a resuscitation intervention, a neonatal death up to 28 days after birth, a maternal pulmonary embolism, a peripartum cardiomyopathy, a fetal academia, or an arrhythmia.

Clause 19: The method of any one of clauses 12 through 18, wherein the machine learning model comprises at least one of a convolutional neural network, a deep convolutional neural network, a random forest, an radial basis function (RBF) kernel support vector machine (SVM), a linear SVM, a linear regression, a logistic regression, a deep multilayer perceptron, a recurrent neural network, a long short-term memory neural network, an artificial neural network, a deep belief network, a Bayesian network, an autoregressive model, a fuzzy-logic system, a hidden Markov model, a Gaussian process model, or a transformer learning model.

Clause 20: A non-transitory computer readable medium includes obtain first patient data from the first wearable device; obtain second patient data from the second device; identify one or more first features of a maternal or a fetal heart rate signal determined from the first patient data; identify one or more second features of a maternal and/or fetal biometric signal determined from the second patient data; determine, based on applying the one or more first features and the one or more second features as inputs to a machine learning model trained with historical first patient data and historical second patient data, one or more predicted outcomes associated with the patient; and generate one or more reports including an indication of the one or more predicted outcomes for display on one or more of a patient computing device or a provider computing device.

Additional examples of components, devices, apparatus, methods, and/or systems which may be used in connection with one or more aspects of this disclosure are described in U.S. Pat. No. 9,579,055, issued Feb. 28, 2017, U.S. Pat. No. 10,292,652, issued May 21, 2019, and United States Patent Application Publication No. 2020/0113470, published on Apr. 16, 2020, each of which is incorporated herein by reference in its entirety.

In one or more examples, the functions described may be implemented in any combination of processing circuitry, including hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors and/or microcontrollers, ASICs, FPGAs, or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware, and/or any other type or combination of processing circuitry.

Various examples have been described. These and other examples are within the scope of the following claims.

The invention claimed is:

1. A system comprising:
a first wearable device configured to be worn by a pregnant patient, the first wearable device further comprising: a plurality of electrodes configured to sense a first patient data associated with the patient and her fetus;
a second device configured to sense a second patient data associated with the patient and her fetus; and
a computing device configured to:
  obtain the first patient data of a mother from the first wearable device;
  obtain the second patient data of a fetus of the mother from the second device;
  identify one or more first features of a maternal or a fetal heart rate signal determined from the first patient data;
  identify one or more second features of a maternal biometric signal or a fetal biometric signal determined from the second patient data;
  determine, based on applying the one or more first features and the one or more second features as inputs to a machine learning model trained with historical first patient data and historical second patient data, one or more predicted outcomes associated with the mother or the fetus of the mother; and
  configure, by the computing device, algorithms to control an acquisition of the maternal biometric signal or the fetal biometric signal, implemented by the first wearable device and the second device, using the historical first patient data and the historical second patient data;
  generate one or more reports including an indication of the one or more predicted outcomes for display on one or more of a patient computing device or a provider computing device, wherein the one or more predicted outcomes is a high risk pregnancy to enable a physician to make a decision to treat the mother and the fetus of the mother in fetal distress by Cesarean section.

2. The system of claim 1, wherein the first patient data comprises a maternal electrocardiography (ECG) or heart rate data or a fetal electrocardiography (ECG) or heart rate data, wherein the second patient data comprises other maternal biometric data or other fetal biometric data.

3. The system of claim 2, wherein the other maternal biometric data or other fetal biometric data comprises at least one of a blood pressure, a weight, a glucose level, a pH blood level, a blood oxygen level, a breathing rate, a temperature, a uterine contraction data, a patient posture, a patient movement, a skin impedance, a stress level, a bioimpedance spectrum, or an acoustic signal.

4. The system of claim 3, wherein the computing device is configured to obtain the other maternal biometric data or other fetal biometric data continuously.

5. The system of claim 1, wherein the computing device is configured to obtain the first patient data or the second patient data nocturnally.

6. The system of claim 1, wherein the first wearable device further comprises a wearable band configured to be worn about a torso of the patient, wherein the plurality of electrodes are affixed to or embedded in the wearable band, wherein the second device comprises at least one of a mobile device configured to sense the second patient data, a smart watch configured to sense the second patient data, a limb sensor configured to sense the second patient data, or a body sensor configured to sense the second patient data.

7. The system of claim 1, wherein the second device is a wearable device.

8. The system of claim 1, wherein the second device comprises at least one of a temperature sensor, an accelerometer, a pulse oximeter, a biopotential sensor, or an impedance sensor.

9. The system of claim 1, wherein the one or more first features comprise at least one of a baseline heart rate, a baseline variability, a number of accelerations per second, a number of early, late, and variable decelerations per second, a number of prolonged decelerations per second, a sinusoidal pattern, an ejection fraction, a P wave, a QRS complex, a T wave, a PQ interval, a QRS duration, a QT interval, or an RR interval.

10. The system of claim 1, wherein the one or more predicted outcomes include at least one of an Apgar score 1, 5 and 10 minutes after birth, a cord blood gas pH level, a neonatal destination immediately after birth, an admission to Neonatal Intensive Care Unit (NICU) within 48 hours of birth, a NICU length of stay, a resuscitation intervention, a neonatal death up to 28 days after birth, a maternal pulmonary embolism, a peripartum cardiomyopathy, a fetal academia, or an arrhythmia.

11. The system of claim 1, wherein the machine learning model comprises at least one of a convolutional neural network, a deep convolutional neural network, a random forest, a radial basis function (RBF) kernel support vector machine (SVM), a linear SVM, a linear regression, a logistic regression, a deep multilayer perceptron, a recurrent neural network, a long short-term memory neural network, an artificial neural network, a deep belief network, a Bayesian network, an autoregressive model, a fuzzy-logic system, a hidden Markov model, a Gaussian process model, or a transformer learning models.

12. A method of treating a mother or a fetus of the mother in fetal distress by Cesarean section comprising:
generating a maternal or fetal outcome prediction, comprising the steps of:
  obtaining, by processing circuitry, first patient data of a mother from a first wearable device;
  obtaining, by processing circuitry, second patient data of a fetus of the mother from a second device;

identifying, by processing circuitry, one or more first features of a maternal or a fetal heart rate signal determined from the first patient data;

identifying, by processing circuitry, one or more second features of a maternal biometric signal or a fetal biometric signal determined from the second patient data;

configuring, by the processing circuitry, algorithms to control an acquisition of the maternal biometric signal or the fetal biometric signal, implemented by the first wearable device and the second device, using a historical first patient data and a historical second patient data; and determining, by processing circuitry and based on applying the one or more first features and the one or more second features as inputs to a machine learning model trained with historical first patient data and historical second patient data, one or more predicted outcomes associated with the mother or the fetus of the mother; and generating, by processing circuitry, one or more reports including an indication of the one or more predicted outcomes for display on one or more of a patient computing device or a provider computing device;

determining, based upon the generated one or more reports, that the mother or the fetus of the mother is in fetal distress; and treating the mother and fetus of the mother by Cesarean section.

13. The method of claim 12, wherein the first patient data comprises a maternal ECG or heart rate data or a fetal ECG or heart rate data, wherein the second patient data comprises other maternal biometric data or other fetal biometric data.

14. The method of claim 13, wherein the other maternal biometric data or other fetal biometric data comprises at least one of a blood pressure, a weight, a glucose level, a pH blood level, a blood oxygen level, a breathing rate, a temperature, a uterine contraction data, a patient posture, a patient movement, a skin impedance, a stress level, a bioimpedance spectrum, or an acoustic signal.

15. The method of claim 14, wherein the processing circuitry obtains the other maternal biometric data or other fetal biometric data continuously.

16. The method of claim 12, wherein the processing circuitry obtains the first patient data or the second patient data nocturnally.

17. The method of claim 12, wherein the one or more first features comprises at least one of a baseline heart rate, a baseline variability, a number of accelerations per second, a number of early, late, and variable decelerations per second, a number of prolonged decelerations per second, a sinusoidal pattern, an ejection fraction, a P wave, a QRS complex, a T wave, a PQ interval, a QRS duration, a QT interval, or an RR interval.

18. The method of claim 12, wherein the one or more predicted outcomes include at least one of an Apgar score 1, 5 and 10 minutes after birth, a cord blood gas pH level, a neonatal destination immediately after birth, an admission to Neonatal Intensive Care Unit (NICU) within 48 hours of birth, a NICU length of stay, a resuscitation intervention, a neonatal death up to 28 days after birth, a maternal pulmonary embolism, a peripartum cardiomyopathy, a fetal academia, or an arrhythmia.

19. The method of claim 12, wherein the machine learning model comprises at least one of a convolutional neural network, a deep convolutional neural network, a random forest, an radial basis function (RBF) kernel support vector machine (SVM), a linear SVM, a linear regression, a logistic regression, a deep multilayer perceptron, a recurrent neural network, a long short-term memory neural network, an artificial neural network, a deep belief network, a Bayesian network, an autoregressive model, a fuzzy-logic system, a hidden Markov model, a Gaussian process model, or a transformer learning model.

20. A system comprising:
a first wearable device configured to be worn by a pregnant patient, the first wearable device further comprising: a plurality of electrodes configured to sense a first patient data associated with the patient and her fetus;
a second device configured to sense a second patient data associated with the patient and her fetus; and
a computing device configured to:
obtain the first patient data of a mother from the first wearable device;
obtain the second patient data of a fetus of the mother from the second device;
identify one or more first features of a maternal or a fetal heart rate signal determined from the first patient data;
identify one or more second features of a maternal biometric signal or a fetal biometric signal determined from the second patient data;
determine, based on applying the one or more first features and the one or more second features as inputs to a machine learning model trained with historical first patient data and historical second patient data, one or more predicted outcomes associated with the mother or the fetus of the mother;
configure, by the computing device, algorithms to control an acquisition of the maternal biometric signal or the fetal biometric signal, implemented by the first wearable device and the second device, using the historical first patient data and the historical second patient data;
generate one or more reports including an indication of the one or more predicted outcomes for display on one or more of a patient computing device or a provider computing device, wherein the one or more predicted outcomes is a high risk pregnancy to enable a physician to make a decision to treat the mother and the fetus of the mother in fetal distress by an appropriate intervention.

* * * * *